US012419207B2

(12) United States Patent
Shimpuku et al.

(10) Patent No.: US 12,419,207 B2
(45) Date of Patent: Sep. 23, 2025

(54) WORK VEHICLE

(71) Applicant: Yanmar Holdings Co., Ltd., Osaka (JP)

(72) Inventors: Yuichi Shimpuku, Okayama (JP); Eiji Arita, Okayama (JP); Harumasa Kitaoka, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 487 days.

(21) Appl. No.: 17/903,459

(22) Filed: Sep. 6, 2022

(65) Prior Publication Data
US 2023/0076284 A1    Mar. 9, 2023

(30) Foreign Application Priority Data
Sep. 6, 2021   (JP) .................. 2021-144482

(51) Int. Cl.
*A01B 69/04*     (2006.01)
*A01D 41/127*    (2006.01)

(52) U.S. Cl.
CPC ........ *A01B 69/008* (2013.01); *A01D 41/1278* (2013.01)

(58) Field of Classification Search
CPC .. A01B 69/008; A01B 69/00; A01D 41/1278; A01D 41/127; A01D 41/12; H01Q 1/125; H01Q 1/3283; H01Q 1/325; B62D 33/0617
See application file for complete search history.

(56) References Cited

U.S. PATENT DOCUMENTS

2014/0133946 A1\* 5/2014 Nishimura ............ E02F 9/0833
                                                        414/687

FOREIGN PATENT DOCUMENTS

| JP | 2001308618 | A  | 11/2001 |
|----|------------|----|---------|
| JP | 2002354929 | A  | 12/2002 |
| JP | 2009207414 | A  | 9/2009  |
| JP | 2010148434 | A  | 7/2010  |
| JP | 2018077174 | A  | 5/2018  |
| JP | 6688545    | B2 | 4/2020  |
| JP | 2020103054 | A  | 7/2020  |
| JP | 2021006005 | A  | 1/2021  |
| WO | 2018088122 | A1 | 5/2018  |

OTHER PUBLICATIONS

JP 2001348196 A with English Translation (Year: 2001).\*
KR 20200016951 A (Year: 2020).\*
European Search Report dated Jan. 23, 2023 issued for EP Application No. 22192799.9.
Japanese Office Action dated Sep. 13, 2024, issued in JP Application No. 2021-144482.

\* cited by examiner

*Primary Examiner* — Lori Lyjak
(74) *Attorney, Agent, or Firm* — NORTON ROSE FULBRIGHT US LLP

(57) ABSTRACT

A work vehicle equipped with a cabin that covers a driving part is disclosed. The work vehicle an antenna unit provided on an upper part of a cabin left side face part, which is one side face part out of left and right side face parts of the cabin, and a handrail part provided on the cabin left side face part and used to perform work on the antenna unit.

7 Claims, 20 Drawing Sheets

WORK VEHICLE

CROSS-REFERENCE TO RELATED APPLICATIONS

This application is claims priority under 35 U.S.C. § 119 to JP Application No. 2021-144482 filed Sep. 6, 2021, the entire contents of which are hereby incorporated by reference.

TECHNICAL FIELD

This invention relates to a work vehicle equipped with an antenna unit for receiving position information from satellites.

BACKGROUND ART

Conventionally, a work vehicle equipped with an antenna unit for receiving position information from satellites is known (see, e.g., Patent Document 1). Patent Document 1 discloses a configuration in which a receiving device such as a Global Navigation Satellite System (GNSS) receiver that receives radio waves relating to positioning information from positioning satellites, an arithmetic device that calculates position data based on radio waves received by the receiving device, and a wireless communication device that transmits position data calculated by the arithmetic device are provided as an antenna unit, and these devices are housed in a case.

In the configuration disclosed in Patent Document 1, the antenna unit is arranged at an upper part of a side face of a cabin that covers a driving part in a combine harvester as a work vehicle. Specifically, the case of the antenna unit is supported via a support frame against a part of a left side of a roof of the cabin, which is an upper part of a left side face part of the cabin.

PRIOR ART DOCUMENT

Patent Document

Patent Document 1: Japanese Patent No. 6688545

SUMMARY OF INVENTION

Technical Problem

According to the configuration disclosed in Patent Document 1, in which the antenna unit is provided at the upper part of the side face of the cabin, such as a side part of the roof of the cabin, the antenna unit is in a high position, so that a worker has to work on a stand, stepladder, or the like when removing, positioning, or maintaining the antenna unit. There are safety concerns when working on a stand, stepladder, etc.

The present invention is made in view of the above situations, and an object of the present invention is to provide a work vehicle that can improve safety of work on an antenna unit in a configuration where the antenna unit is provided at a height position of an upper part of a cabin.

Solution to Problem

A work vehicle according to the present invention is a work vehicle equipped with a cabin that covers a driving part, the work vehicle comprises: an antenna unit provided at an upper part of one side face part out of left and right side face parts of the cabin; and a handrail part provided on the one side face part and used to perform work on the antenna unit.

In the work vehicle according to the present invention, the antenna unit and the handrail part are arranged so as to be positioned in front of and behind each other in a plan view.

In the work vehicle according to the present invention, the work vehicle further comprises: a support member provided on the one side face part and supporting the antenna unit; the support member extends back and forth and is provided in such a state that its front and rear end parts are fixed to the one side face part; and the handrail part extends up and down, and is provided in such a state that its upper end part is connected to the support member and its lower end part is fixed to the one side face part.

In the work vehicle according to the present invention, the cabin is provided to be rotatable around a shaft in an up-down direction with respect to a traveling machine body so that the cabin opens outward in a left-right direction of a machine body of the work vehicle; and the one side face part is a side face part that is positioned inside in the left-right direction of the machine body out of the left and right side face parts of the cabin.

In the work vehicle according to the present invention, the handrail part is constituted of metal components and is provided so that its upper end is positioned at a height below the antenna unit.

In the work vehicle according to the present invention, the antenna unit is provided to be repositionable with respect to its height position, which is its position in the up-down direction, between a first height position in which the entire antenna unit is positioned above the support member and a second height position in which at least a part of the antenna unit is overlapped with the support member.

In the work vehicle according to the present invention, the work vehicle further comprises an antenna for obtaining information about the antenna unit; and the antenna is provided at a connection part of the handrail part with respect to the support member.

Advantageous Effects of Invention

According to the present invention, safety of work on an antenna unit can be improved in a configuration in which the antenna unit is provided at a height position of an upper part of a cabin.

DESCRIPTION OF EMBODIMENTS

This invention seeks, in a configuration where an antenna unit for receiving position information from satellites is provided at a height position of an upper part of a cabin that covers a driving part, to improve safety of work on the antenna unit by providing a handrail part on the cabin. A description will hereinafter be made on an embodiment of the present invention with reference to the drawings.

In the following description of embodiments of the present invention, a combine harvester will be used as an example of a work vehicle according to the present invention. However, the work vehicle according to the present invention should be equipped with a cabin that covers a driving part. The work vehicles to which this invention is applied include various types of combine harvesters, such as head-feeding type combine harvesters and ordinary type combine harvesters, as well as tractors and wheel loaders for construction work, for example.

An overall configuration of a combine harvester 1 as a work vehicle of this embodiment will be described using FIGS. 1 through 3. In the following description, the left side and the right side toward the front of the combine harvester 1 are referred to as the left side and the right side in the combine harvester 1, respectively.

Figure 1:
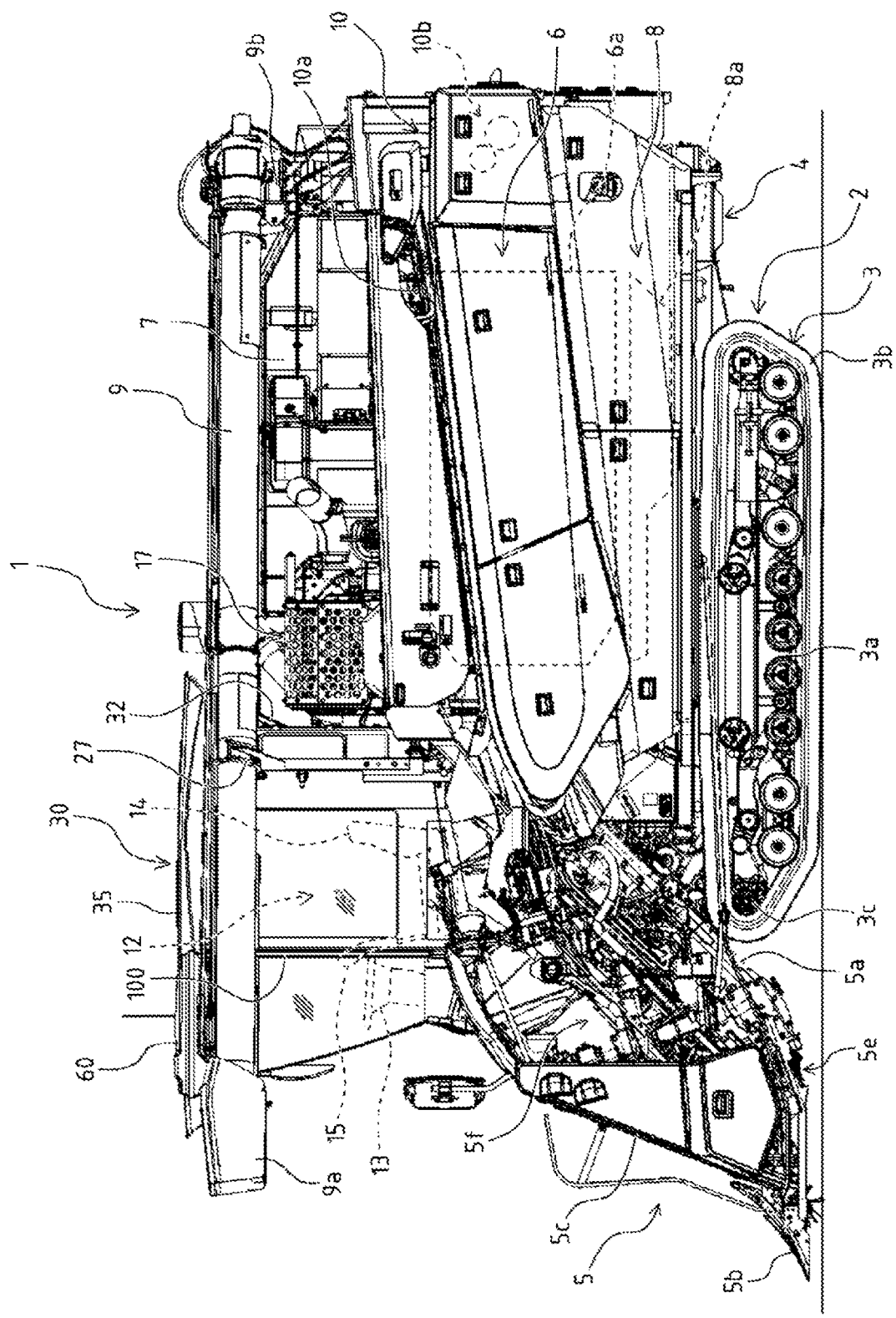
FIG. 1 is a left side view of a combine harvester according to an embodiment of the present invention.
Figure 2:
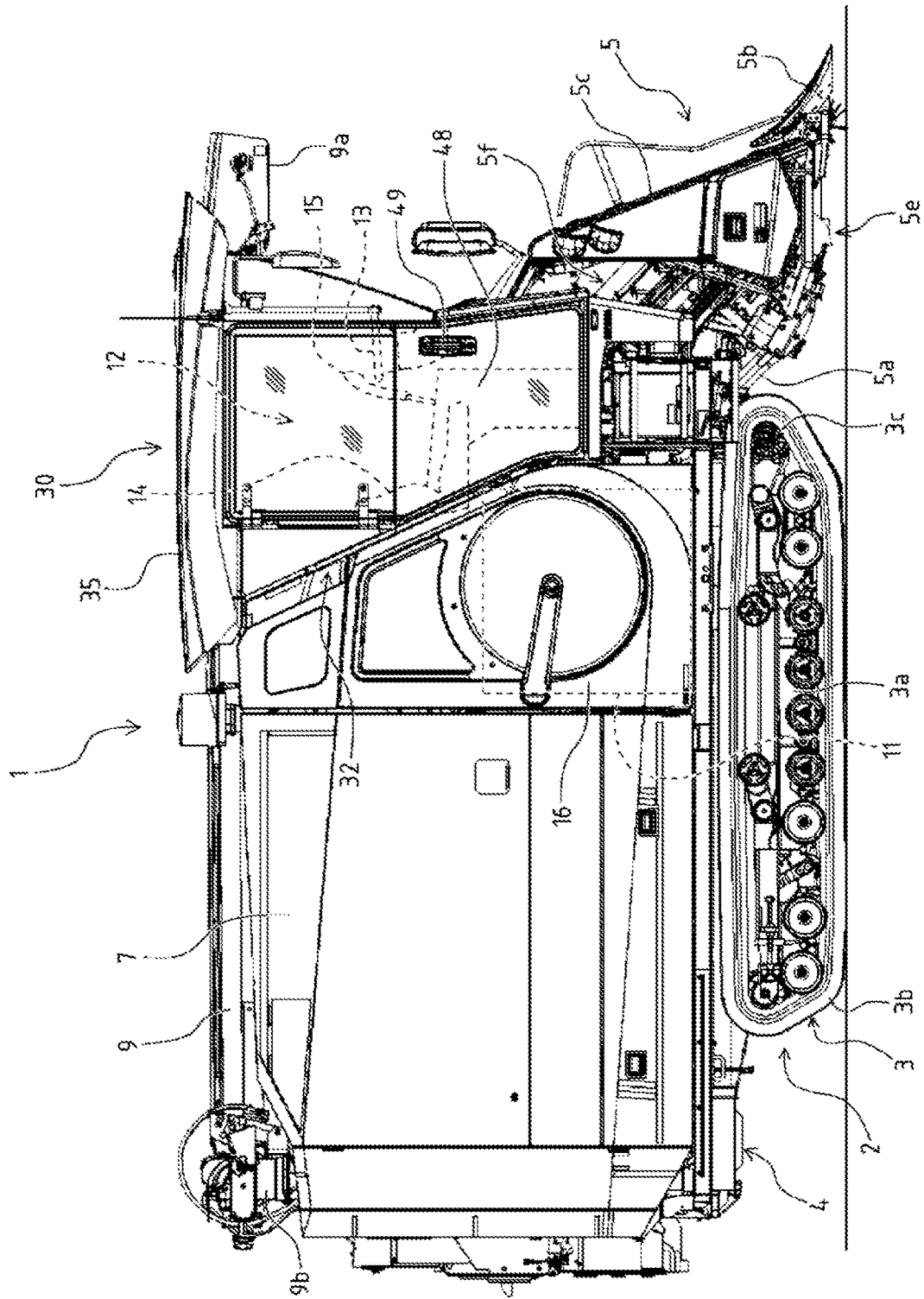
FIG. 2 is a right side view of the combine harvester according to the embodiment of the present invention.
Figure 3:
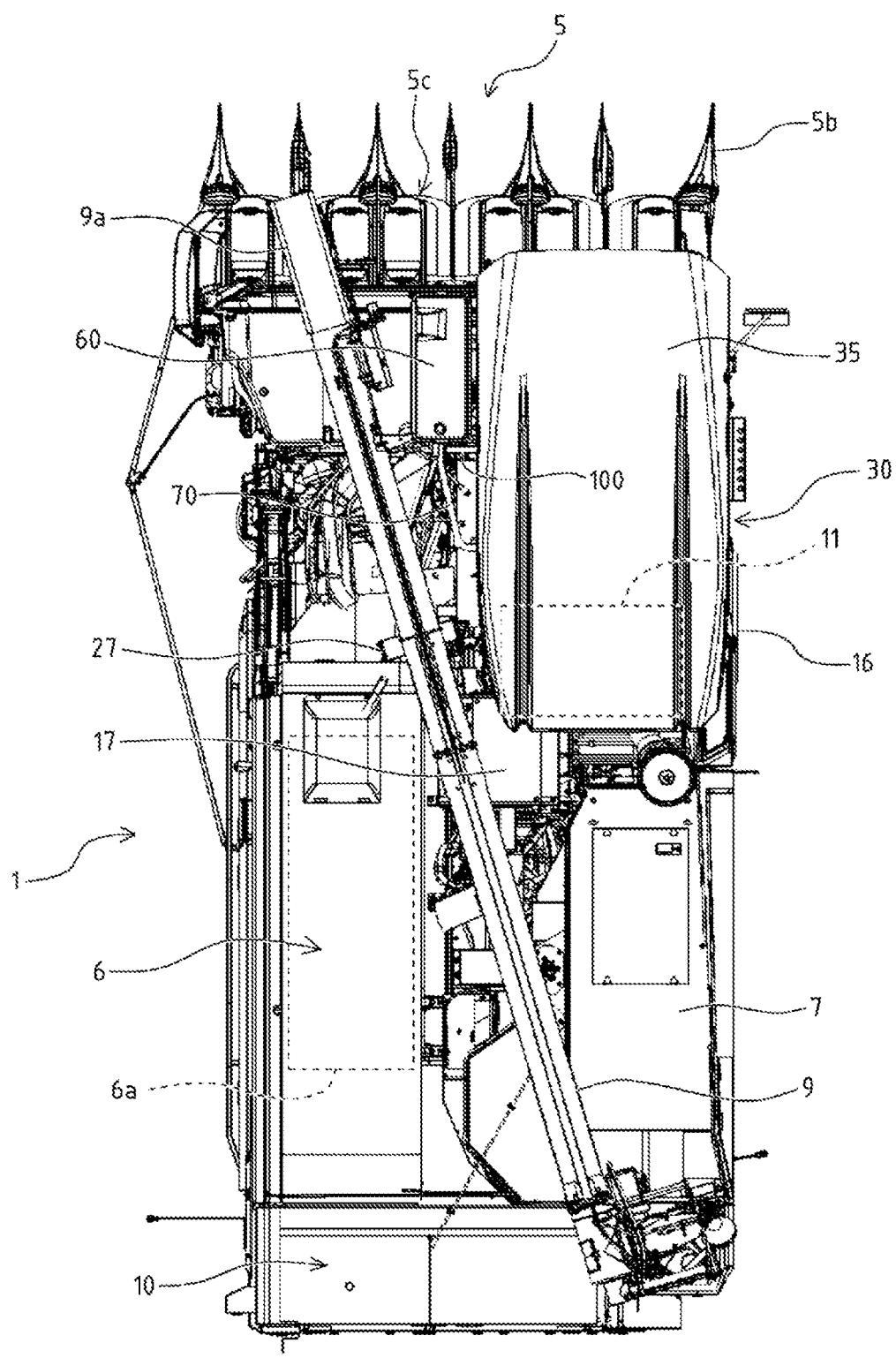
FIG. 3 is a plan view of the combine harvester according to the embodiment of the present invention.

As shown in FIGS. 1 through 3, the combine harvester 1 comprises a traveling part 2, which is configured as a crawler-type traveling device having a pair of right and left crawler parts 3, 3, and a traveling machine body 4, which is supported by the traveling part 2. The combine harvester 1 comprises a reaping part 5, a threshing part 6, a grain tank 7, a sorting part 8, a discharging auger 9, and a waste straw treating part 10. An engine 11 is mounted on the traveling machine body 4 as a drive source. The combine harvester 1 further comprises a cabin 30 that covers a driving part 12.

Each crawler part 3, which constitutes the traveling part 2, has a track frame 3a extending in a front-back direction below the traveling machine body 4, various rotating bodies such as driving sprockets 3c and the like supported by the track frame 3a, and a crawler track 3b wound around these rotating bodies. The crawler part 3 receives transmission of power from the engine 11 at the driving sprockets 3c to be driven.

The reaping part 5 is a device configuration for taking in grain culms in a field while reaping them, and is provided at a front part of the traveling machine body 4. The reaping part 5 is provided on a front side of the traveling machine body 4 over the approximately entire width of the machine body of the combine harvester 1. The reaping part 5 is mounted on the traveling machine body 4 in such a manner that it can be rotated around a predetermined axis via a hydraulic cylinder for elevation, and is provided in such a manner that it can be adjusted and elevated by a rotary motion caused by the an expansion and contraction motion of the hydraulic cylinder.

The reaping part 5 has a reaping support machine frame 5a as a reaping frame, and this reaping support machine frame 5a is configured to support a grass divider 5b, a raising up device 5c, a reaping blade device 5e, and a grain culm conveying device 5f. The reaping part 5 divides grain culms in a field by the grass divider 5b, raises the divided grain culms by the raising up device 5c, conveys the raised grain culms to a rear side by the grain culm conveying device 5f, and cuts and reaps these grain culms by the reaping blade device 5e. The grain culms reaped by the reaping part 5 are conveyed to the threshing part 6. Each device that the reaping part 5 has is operated by power transmitted from the engine 11.

The reaping part 5 is side-openable with respect to the traveling machine body 4. Specifically, the reaping support machine frame 5a, which constitutes the reaping part 5, is rotatably supported by a rotary support part with its axis direction along an up-down direction with respect to the traveling machine body 4. The rotary support part is provided, for example, on a left side of the traveling machine body 4. The reaping part 5 rotates within an angular range from a normal state facing the front to a state in which it rotates toward the left with a rotation shaft of the rotary support part as a center, for example, to face the left side.

On the traveling machine body 4, the threshing part 6 that threshes the grain culms reaped by the reaping part 5 and the grain tank 7 as a grain storage part that stores the grains taken out from the threshing part 6 are provided side by side. The threshing part 6 and grain tank 7 are located on the left and right sides of the machine body, respectively. The combine harvester 1 performs reaping of grain culms by the reaping part 5 and threshing by the threshing part 6 while traveling by the traveling part 2.

The threshing part 6 has a threshing cylinder 6a and a treating cylinder (not shown in Fig.) whose axes of rotation are in the front-back direction, and a grain culm feeder (not shown in Fig.) provided at the left of the threshing cylinder 6a. The grain culm feeder holds feet of the grain culms reaped by the reaping part 5 and conveys the grain culms backward in a lying position with tips of the grain culms on the side of the threshing cylinder 6a. The grain culm feeder has a feed chain wound around a plurality of sprockets having a left-right direction as the rotation shaft direction, and a grain culm feed clamper that works with the feed chain to clamp the feet of the grain culms.

The sorting part 8 is provided below the threshing part 6 on the traveling machine body 4 to sort and treat the treatment material threshed by the threshing part 6. The sorting part 8 has an oscillating sorting device 8a, a wind sorting device not shown in figure, and a grain conveying device. In the sorting part 8, treatment materials falling from the threshing part 6 are sorted by the oscillating movement of the oscillating sorting device 8a, and the treatment materials after oscillating sorting are sorted by the wind of the wind sorting device. In the sorting part 8, among the treatment materials after wind sorting, grains are conveyed to the right toward the grain tank 7 by the grain conveying device, and straw debris and dust are blown backward to the outside of the machine body by the wind sorting device. The grains conveyed by the grain conveying device toward the grain tank 7 are stored in the grain tank 7.

The discharging auger 9 is provided on the traveling machine body 4 as a grain discharging device for discharging grain in the grain tank 7 to outside. The discharging auger 9 is provided rotatably with respect to the traveling machine body 4 via a vertical take-out conveyor 9b provided on the right rear side of the traveling machine body 4. In addition, the discharging auger 9 can be elevated and rotated up and down with its base as a center.

The discharging auger 9 is in a storage state when it is extended horizontally from the vertical take-out conveyor 9b on the right rear side of the traveling machine body 4 to the left forward. In the storage state, the discharging auger 9 is extended along a diagonal line of the machine body with a tip end part of the discharging auger 9 positioned at a part of the left side of the reaping part 5 in the plan view (see FIG. 3). The discharging auger 9 becomes in a storage state when it is placed on and supported by an auger rest 27 as an auger receiving part.

The auger rest 27 is provided at the left of the rear part of the cabin 30 in a state of being supported by a predetermined support member. The auger rest 27 has a concave shape with an upper side as an open side so as to store and support the cylindrical discharging auger 9 in a positioned state, and supports a predetermined portion in an intermediate part of the discharging auger 9 in an extension direction from a lower side.

The grains stored in the grain tank 7 are conveyed by the discharging auger 9 with a built-in screw conveyor, and are discharged from a discharge port 9a provided at a tip end part of the discharging auger 9. The grains discharged from the discharge port 9a are put into truck beds, containers, etc. When discharging the grains, the discharging auger 9 moves the discharge port 9a to the outside of the machine body by rotating from the storage state to the left-right direction or up-down direction of the machine body.

The waste straw treating part 10 is provided behind the threshing part 6 on the traveling machine body 4 to treat the waste straw after being threshed by the threshing part 6. The waste straw treating part 10 has a waste straw conveyor 10a and a waste straw cutter 10b. The waste straw conveyor 10a conveys the threshed grain culms (waste culms) that have been threshed by the threshing part 6 backward and either discharges them to the outside of the machine body or conveys them to the waste straw cutter 10b. The waste straw cutter 10b cuts the waste culms conveyed from the waste straw conveyor 10a and discharges them to the outside of the machine body.

The driving part 12 that is covered by the cabin 30 is provided on the traveling machine body 4, at the right of the reaping part 5 and in front of the grain tank 7. In other words, the driving part 12 is provided in the cabin 30 above a front part of the traveling machine body 4. A handle 13 as a steering operation part is provided at the front part of the driving part 12, and a driver's seat 14 is provided behind the handle 13. In addition, various operation tools and other equipment, including a main speed change lever 15, are located at the left side of the driver's seat 14.

A prime mover part, including the engine 11, is provided below the rear of the driving part 12. The power of the engine 11 is transmitted through a speed change device, etc. to various devices in each part of the combine harvester 1, such as the traveling part 2, reaping part 5, threshing part 6, sorting part 8, discharging auger 9, and waste straw treating part 10. The engine 11 is a diesel engine. An engine cover 16 that covers a right side of an engine room is provided at the right side of the engine 11.

The combine harvester 1 further comprises an exhaust gas purifier 17 for purifying exhaust gas from the engine 11. The exhaust gas purifier 17 has a diesel particulate filter case (DPF case) and a Selective Catalytic Reintroduction (SCR) case, and purifies the exhaust gas by introducing exhaust gas from the engine 11 into these cases and removing particulate matter such as soot and nitrogen oxides (NOx) contained in the exhaust gas. The exhaust gas purifier 17 is provided above the body part of the engine 11 and at the left rear side of the cabin 30.

A description will be made on a configuration of the cabin 30 with reference to FIG. 4 through 6. The cabin 30 has a front face part 31, a rear face part 32, a left side wall part 33, a right side wall part 34, a roof part 35 that forms a ceiling, and a floor part 36, which together form a substantially box-shaped structure.

The front face part 31 of the cabin 30 has a front upper face part 31a in a forward-inclined shape, which constitutes the upper side more than half part of the front face part 31 and a front lower face part 31b in a forwardly descending inclined shape, which constitutes the approximate lower half part of the front face part 31, and as a whole has a bent shape that is concave to the rear side in the side view. The front upper face part 31a is formed as an entirely transparent window part by a rectangular transparent plate made of glass, acrylic resin or polycarbonate resin and the like. The front lower face part 31b is constituted of a steel plate or other metal member.

The rear face part 32 of the cabin 30 has a backward-inclined shape in the side view. In other words, the rear face part 32 as a whole is provided as a forwardly descending inclined face part from the front side to the rear side, from the lower side to the upper side.

Figure 4:
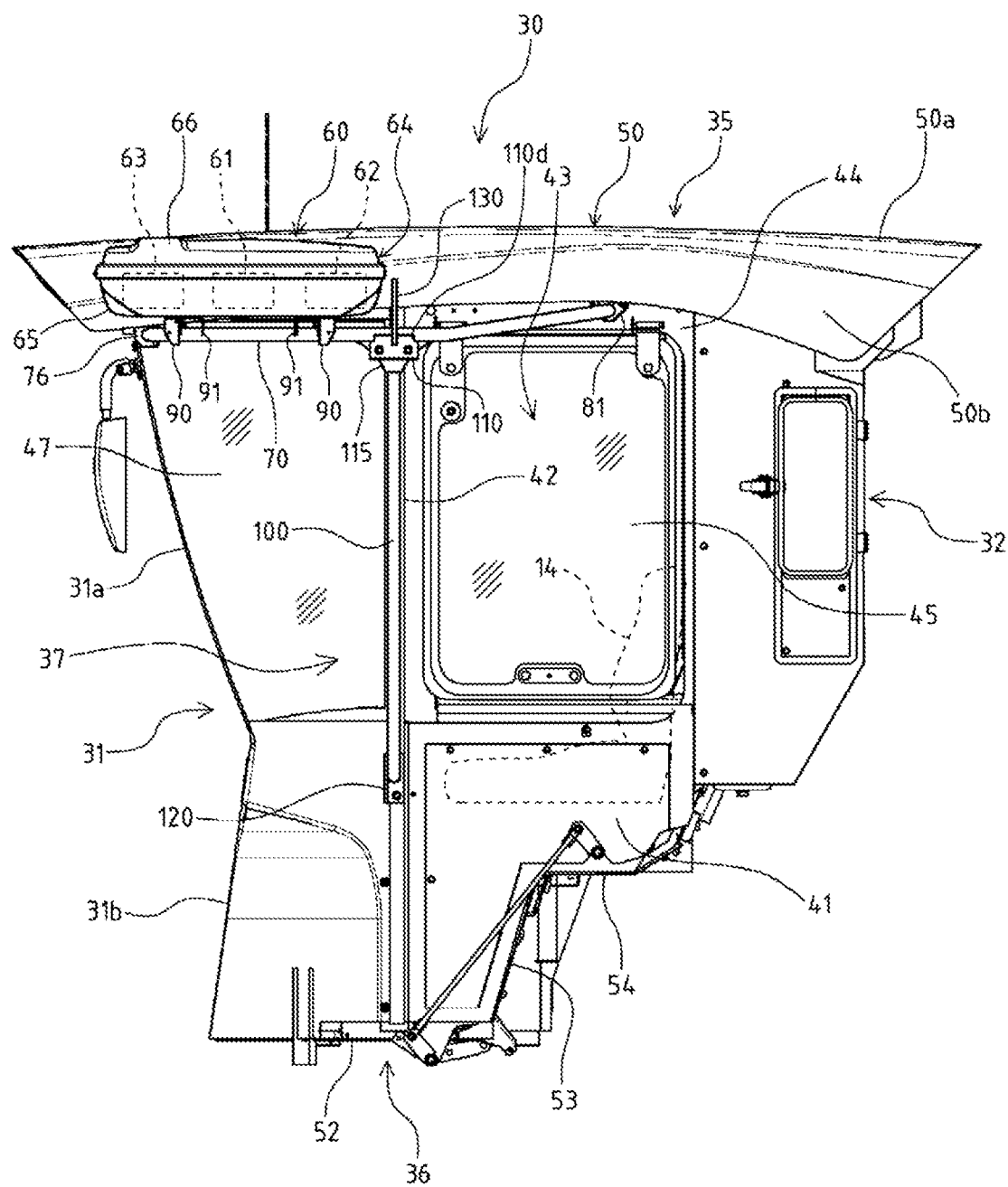
FIG. 4 is a left side view of a cabin according to the embodiment of the present invention.
Figure 5:
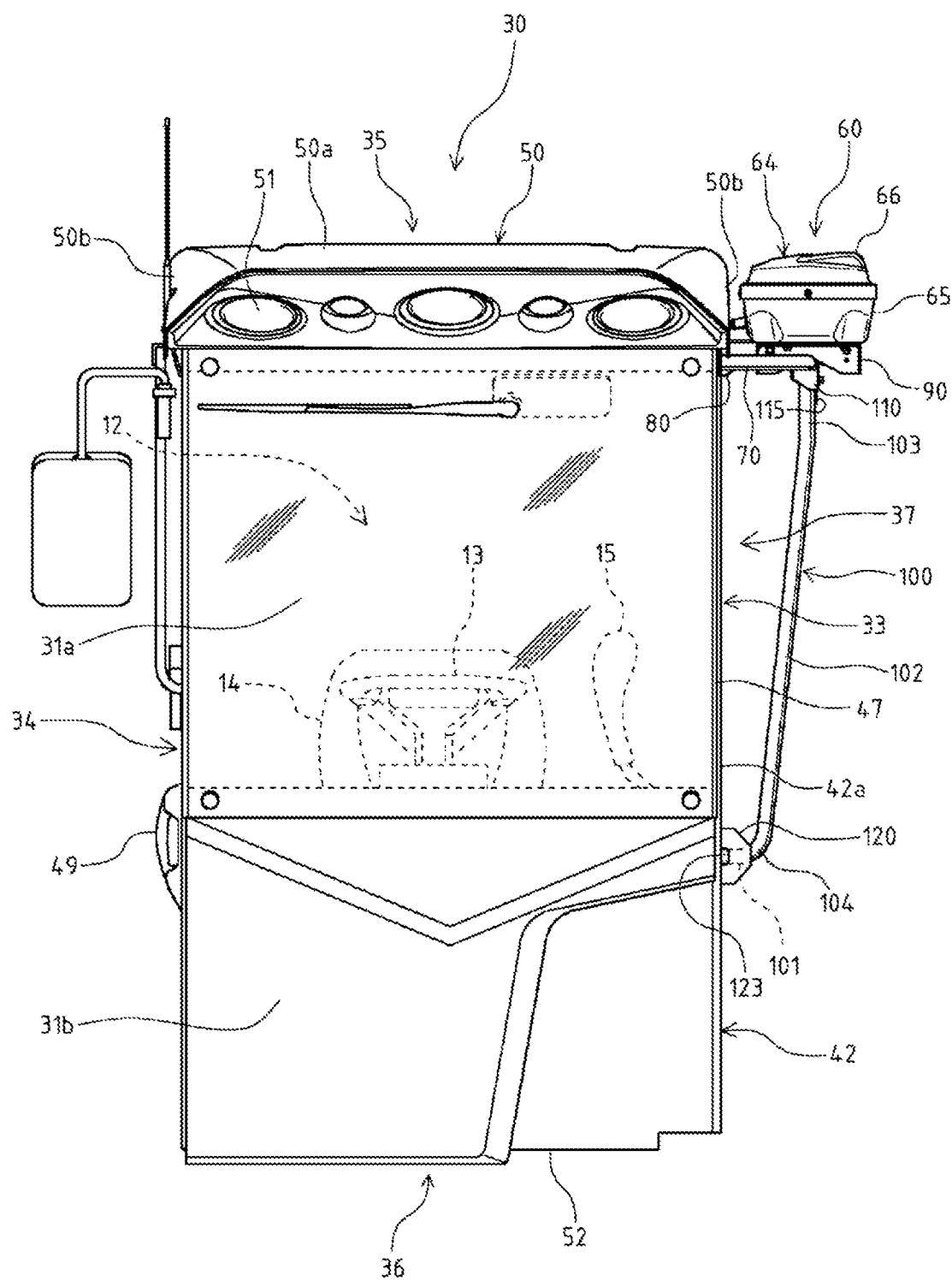
FIG. 5 is a front view of the cabin according to the embodiment of the present invention.

The left side wall part 33 of the cabin 30 has a lower side part as a lower side face part 41 that is a sheet metal part made of steel plate or the like (see FIG. 4). A left pillar part 42, which is straight along the up-down direction, is provided in the left side wall part 33 in the intermediate part of the front-back direction.

The left pillar part 42 is provided in the left side wall part 33 over the approximately entire up-down direction. The left pillar part 42 is a hollow column part that is rectangular in a planar cross-sectional view and has a vertical, flat left side face 42a. The left pillar part 42 is provided so that the left side face 42a protrudes slightly to the left relative to the other parts in the left side wall part 33.

In the left side wall part 33, above the lower side face part 41 and behind the left pillar part 42, a rectangular-shaped left rear window part 43 is provided. The left rear window part 43 is composed by installing a rectangular glass or other transparent plate 45 to a frame-like part formed at the upper part of the left side plate 44 that forms the rear side part of the left pillar part 42 in the left side wall part 33. The lower part of the left side plate 44 forms the lower side face part 41.

In the left side wall part 33, a part forward of the left rear window part 43 is a left front window part 47. The left front window part 47 has an approximately inverted trapezoidal shape, a front side edge part of the left front window part 47 is disposed along the forward inclination of the front upper face part 31a of the front face part 31, and a rear side edge thereof is disposed along the upper part of the left pillar part 42. The left front window part 47 is formed by a rectangular transparent plate made of glass, acrylic resin, polycarbonate resin, or the like, and is provided in the approximately same range as the front upper face part 31a of the front face part 31 in the up-down direction.

In the left side wall part 33, above the left front window part 47, there is a front upper side plate 57. The front upper side plate 57 forms an upper edge part of a part of the left side wall part 33, and the part of the left side wall part 33 is in front of the left pillar part 42. The front upper side plate 57 overlaps its lower part from the inside (right side) against the upper edge part of the left front window part 47.

The right side wall part 34 of the cabin 30 is provided with a door 48, which is an open/close door for getting in and out (see FIG. 2). The door 48 is rotatably supported against a frame part of the cabin 30 in a manner that the door 48 opens outward from the front side. A handle 49 is provided on a front part of the door 48.

The roof part 35 of the cabin 30 has an approximately rectangular outer shape with a longitudinal direction in the front-back direction in the plan view. The roof part 35 has its front side edge end part projecting forward in an eaves shape against an upper end part of the front face part 31, and its rear side edge end part projecting backward in an eaves shape against the upper end part of the rear face part 32. A plurality of lighting parts 51 are provided side by side on the front end face part of the roof part 35 (see FIG. 5).

The roof part 35 has a flattened outer shape and is hollow. The roof part 35 has a lower side panel (not shown in Fig.) that forms a base part of the roof part 35, and a roof panel 50 provided on the upper side of the lower side panel, and these panels form a hollow part. The roof panel 50 has an upper face part 50a and left and right side face parts 50b that are formed by bending downwardly on both the left and right sides of the upper face part 50a. The roof panel 50 is a covering member that is provided to cover the lower side panel part entirely from the upper side and from both the left and right sides.

In addition, the left side face part 50b of the roof panel 50 covers the upper edge part of the left side wall part 33 from the left, and the right side face part 50b of the roof panel 50 covers the upper edge part of the right side wall part 34 from the right. The interior of the roof part 35 is provided with an indoor unit of an air-conditioning device and other equipment that combine harvester 1 has.

The floor part 36 of the cabin 30 is formed into a floor face part 52 in a horizontal face shape in front of and below the driver's seat 14. A seat support face part 54 in a substantially horizontal shape is provided at the rear side of the floor face part 52 via a forwardly descending inclined face part 53, and the driver's seat 14 is installed on the seat support face part 54 (see FIG. 4).

In the cabin 30 with the above configuration, the left side face part of the cabin 30 is formed by the left side wall part 33 and a part of the left side of the roof part 35. In addition, the right side face part of the cabin 30 is formed by the right side wall part 34 and a part of the right side of the roof part 35. In the following, in the cabin 30, the left side face part including the left side wall part 33 and the part of the left side of the roof part 35 is referred to as a cabin left side face part 37.

The combine harvester 1 of this embodiment comprises an antenna unit 60 for receiving position information from satellites. The antenna unit 60 is provided at an upper part of the cabin left side face part 37 out of the left and right side face parts of the cabin 30. The antenna unit 60 is provided in a supported state via a predetermined support member with respect to the cabin 30 so that the antenna unit 60 is positioned near the left of the upper part of the cabin left side face part 37.

The antenna unit 60 has a box-like outer shape that is approximately rectangular in the plan view and is provided in an orientation where the longitudinal direction is the front-back direction. The antenna unit 60 is provided at approximately the same height as the roof part 35 with respect to the up-down direction. Specifically, the antenna unit 60 is provided so that its dimension in the up-down direction is approximately the same as the dimension of the side face part 50b of the roof panel 50 in the up-down direction. Concerning the up-down direction, the antenna unit 60 is provided so that the substantially whole part of the antenna unit 60 in the up-down direction is positioned in the height range of the side face parts 50b of the roof panel 50.

In the front-back direction, the antenna unit 60 is positioned in front of the left pillar part 42 provided on the cabin left side face part 37. Specifically, the antenna unit 60 is positioned with its rear end part near the left pillar part 42 in the front-back direction, and is provided along the upper edge part of the left front window part 47 in a left side view. The antenna unit 60 has approximately the same length as the upper edge part of the left front window part 47 in the front-back direction. The antenna unit 60 has an approximate dimension of ⅓ of the overall length of the roof part 35 in the front-back direction, and is provided at a position on the left front side with respect to the roof part 35 (see FIG. 6).

In the left-right direction, the antenna unit 60 is provided so that the right side face part of the antenna unit 60 is positioned directly to the left of the left side face part 50b of the roof panel 50. Thus, the antenna unit 60 is positioned adjacent to the left of the front part of the roof part 35 with respect to the cabin 30.

According to this arrangement configuration of the antenna unit 60, in a configuration in which the cabin 30 is provided in the right front part of the machine body of the combine harvester 1, the antenna unit 60 is positioned in approximately the center part of the machine body in the left-right direction (see FIG. 3). In addition, since the antenna unit 60 is positioned in the front left of the roof part 35, light distribution by the lighting parts 51 and a view from inside the cabin 30 is not obstructed by the antenna unit 60.

In addition, a space is formed on the left side of the cabin 30 between the discharging auger 9 in a storage state and the cabin 30, and the antenna unit 60 uses and is located in the space. The discharging auger 9 rotates from the storage state to the left or upward of the machine body. Therefore, the antenna unit 60 does not interfere with the discharging auger 9.

The antenna unit 60 is configured as a positioning unit for receiving radio waves from positioning satellites and measuring the position of the combine harvester 1. The antenna unit 60 comprises a receiving device 61 as a receiving part, an inertial navigation device 62 as an arithmetic part, a wireless communication device 63 as a communication part, and a case 64 that houses these devices. An automatic steering system of the combine harvester 1 is constituted by the antenna unit 60.

The receiving device 61 receives radio waves from positioning satellites, converts the received radio waves into signals, and transmits the signals to the inertial navigation device 62. The receiving device 61 is, for example, a GNSS receiver (GNSS antenna) that receives radio waves from a group of GNSS satellites or a GPS receiver (GPS antenna) that receives radio waves from Global Positioning System (GPS) satellites, and so on.

The inertial navigation device 62 measures triaxial gyros and acceleration in three directions to calculate posture orientation data. In addition, the inertial navigation device 62 calculates position data based on signals transmitted from the receiving device 61. The inertial navigation device 62 functions as an arithmetic device that calculates position data based on position information from the receiving device 61. For example, if the inertial navigation device 62 is equipped with a GNSS receiver, the reliability of the posture orientation data calculated by the inertial navigation device 62 will be improved.

By equipping the antenna unit 60 with the inertial navigation device 62, it is possible to use inertial navigation to calculate the speed and distance of movement based on the acceleration in the three directions detected by the inertial navigation device 62, even in situations where radio waves from positioning satellites cannot be received due to bad weather, radio wave interference, etc.

The wireless communication device 63 transmits position data and posture orientation data calculated by the inertial navigation device 62 to the outside via wireless communication. The wireless communication device 63 is a data communication device using, for example, wireless Local Area Network (LAN) or mobile communication. The data transmitted from the wireless communication device 63 is received by, for example, a portable terminal owned by an operator or an Electronic Control Unit (ECU) of the combine harvester 1, and is used to check the position of the combine harvester 1 in a field or the posture of the combine harvester 1 (e.g., forward/backward/left/right inclination).

The case 64 has a lower case body 65 that forms the lower part of the case 64 and an upper case body 66 that forms the upper part of the case 64, and these case bodies form a housing space and an outer shape of the antenna unit 60. The case 64 has a relatively flat box-like outer shape with the front-back direction as the longitudinal direction by the lower case body 65 and the upper case body 66. The lower case body 65 and upper case body 66 are members made of resin, for example.

The lower case body 65 is a box-shaped member with the upper side open, and has a bottom face part 65a in a horizontal shape and a peripheral wall part 65b including front, rear, right, and left side face parts and forming an opening part in a rectangular shape by the upper edge parts. The upper case body 66 is a lid-like part that covers the opening part of the lower case body 65 from the upper side. The upper case body 66 has a rectangular edge part formed by the front, rear, right, and left face parts, and is provided in a state where this edge part is fitted to the rectangular opening part of the lower case body 65. The upper case body 66 is fitted to the lower case body 65 with its lower side opening edge part overlapping the upper side opening edge part of the lower case body 65 from the outside. Both case bodies are fixed to each other at multiple locations by fixtures 67 such as bolts that pass through the fitting parts of each other.

In the case 64, from front to rear, the wireless communication device 63, receiving device 61, and inertial navigation device 62 are arranged in this order, with these devices spaced at predetermined intervals. These devices are provided in the case 64, in a state of being fixed by fixtures such as bolts to a device mounting plate 68 (see FIG. 16) that is provided on the upper side of the bottom face part 65a of the lower case body 65.

As described above, the antenna unit 60 is constituted of the receiving device 61, inertial navigation device 62 and wireless communication device 63 in the case 64 as an integrated unit. This allows the antenna unit 60 to have good attachability to the machine body and high versatility for multiple models.

In addition, with respect to the layout configuration of the antenna unit 60, the antenna unit 60 is positioned at a left and right central part of the machine body, which can reduce errors in acquiring the position information and posture orientation information of the combine harvester 1 and obtain good positioning accuracy. In addition, the antenna unit 60 is provided at approximately the same height as the roof part 35 of the cabin 30, which is a high position in the combine harvester 1, and thus good positioning accuracy can be obtained.

The positioning data (position data and posture orientation data) acquired by the antenna unit 60 is used to control the autonomous combine harvester 1, which performs work while traveling autonomously along a predetermined route. The position data is used, for example, to determine whether the combine harvester 1 is traveling along a predetermined route. In addition, the posture orientation data is used to check the driving condition of the combine harvester 1 and the condition of the field, for example, by recognizing the inclination of the combine harvester 1. The operator can also send real-time instructions to the combine harvester 1 by receiving transmitted data from the wireless communication device 63.

The configuration of the antenna unit 60 is not limited to this embodiment. As a configuration of the antenna unit 60, for example, the antenna unit 60 may be configured to have a receiving device 61 function as an arithmetic part that calculates position data from position information received by the receiving device 61, thereby omitting the inertial navigation device 62.

Figure 7:
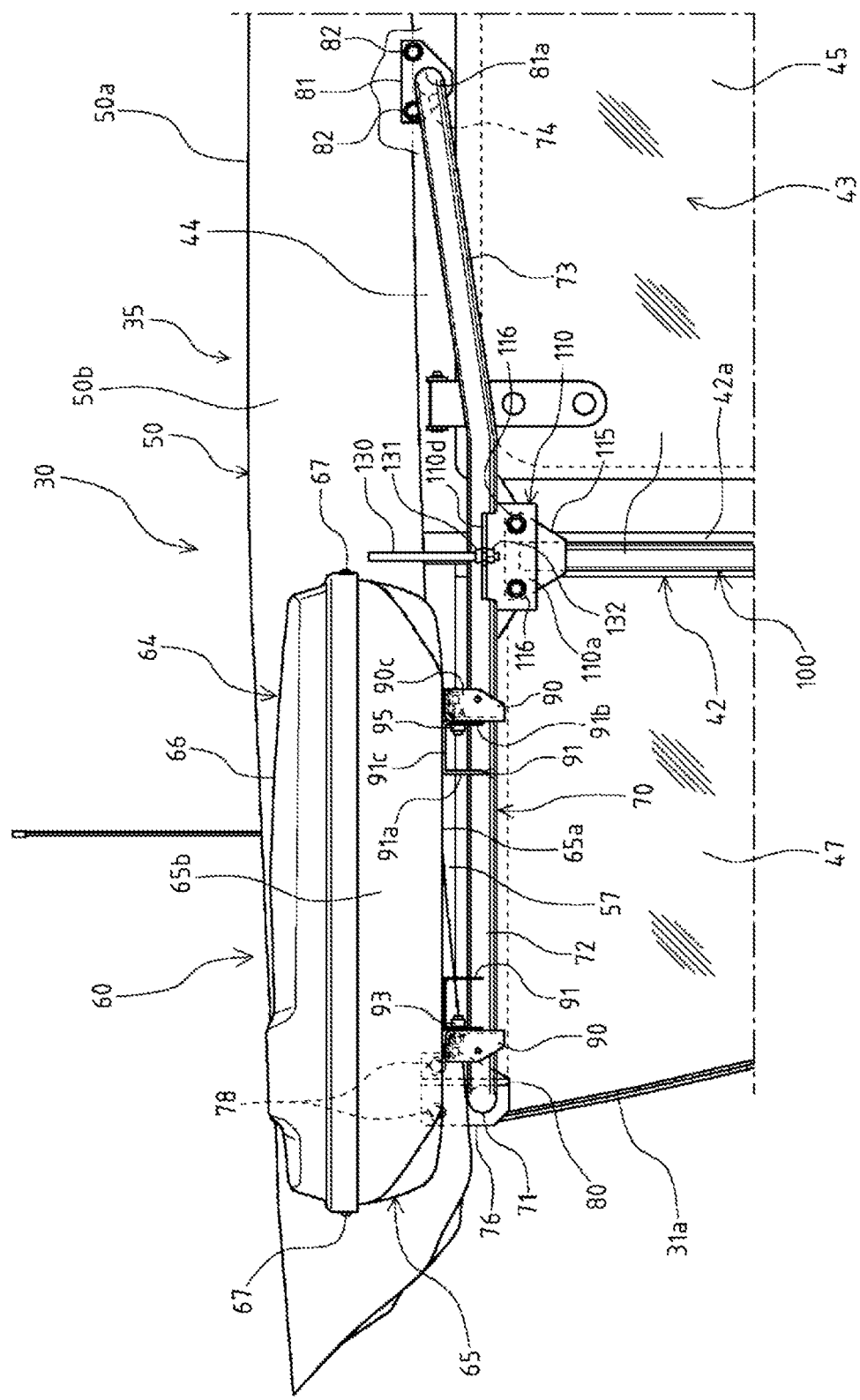
FIG. 7 is a left side view showing an antenna unit and its support configuration according to the embodiment of the present invention.
Figure 8:
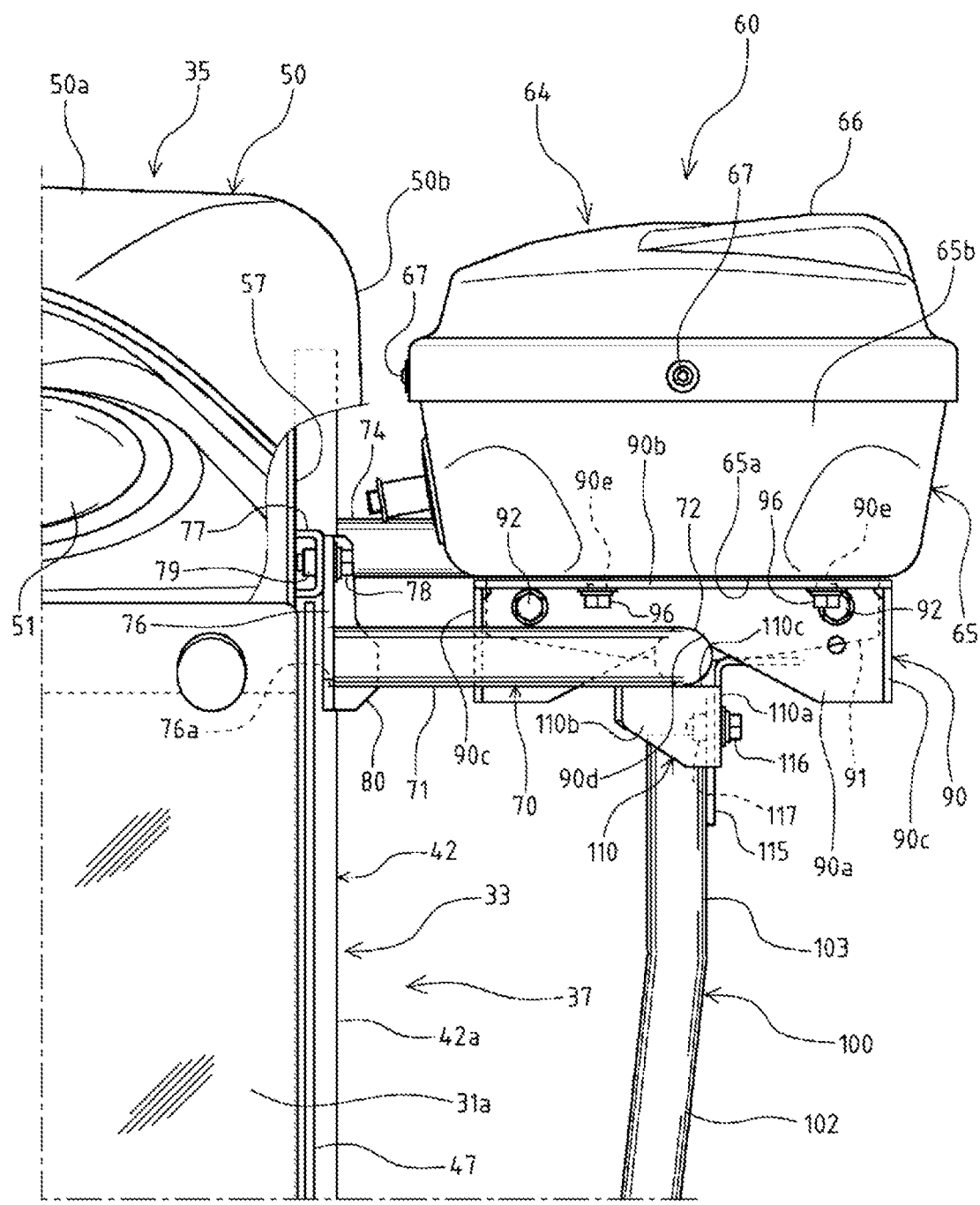
FIG. 8 is a front view showing the antenna unit and its support configuration according to the embodiment of the present invention.
Figure 9:
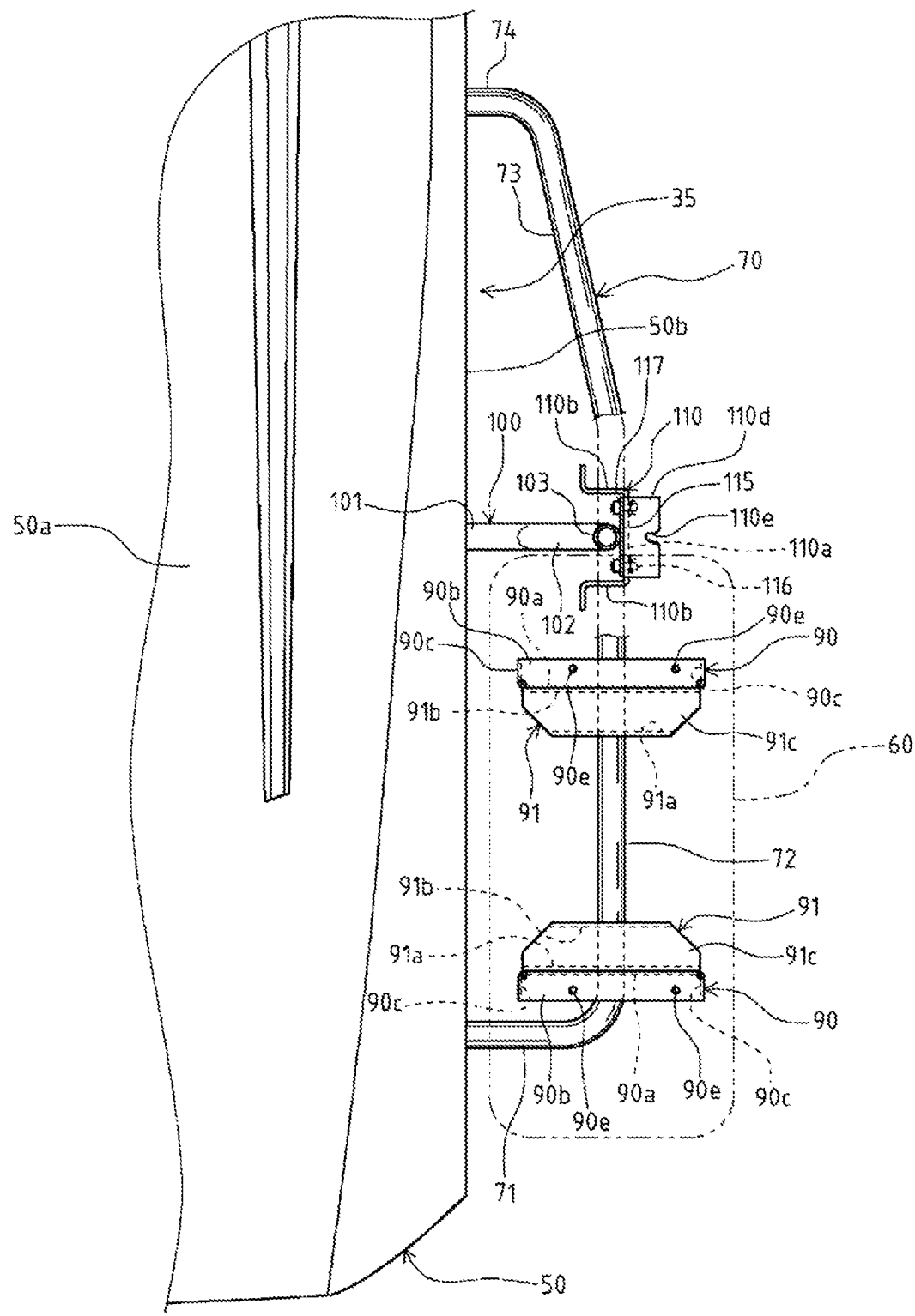
FIG. 9 is a plan view showing the antenna unit and its support configuration according to the embodiment of the present invention.
Figure 10:
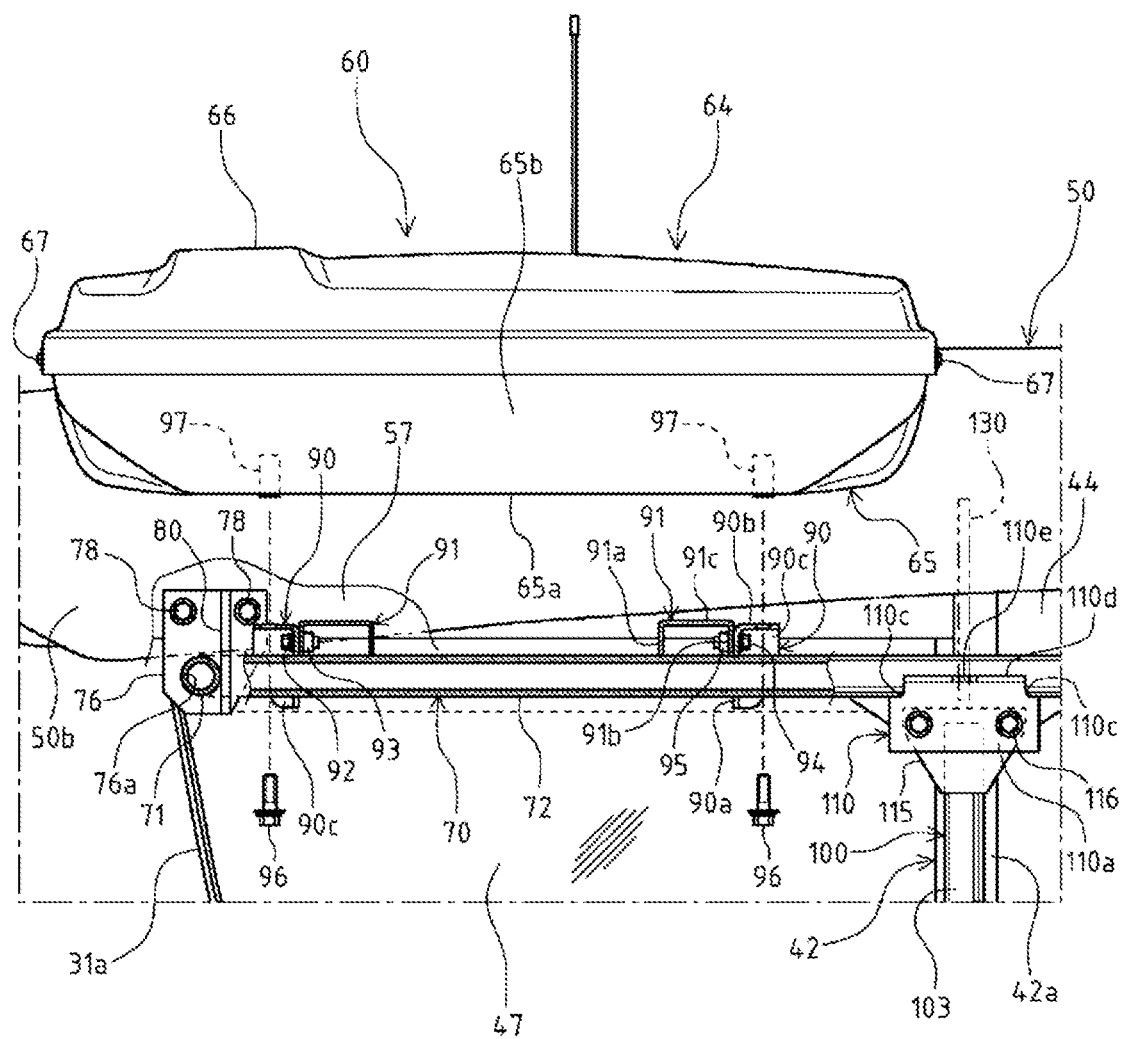
FIG. 10 is a partial cross-sectional, exploded left side view showing a mounting structure of the antenna unit according to the embodiment of the present invention.
Figure 11:
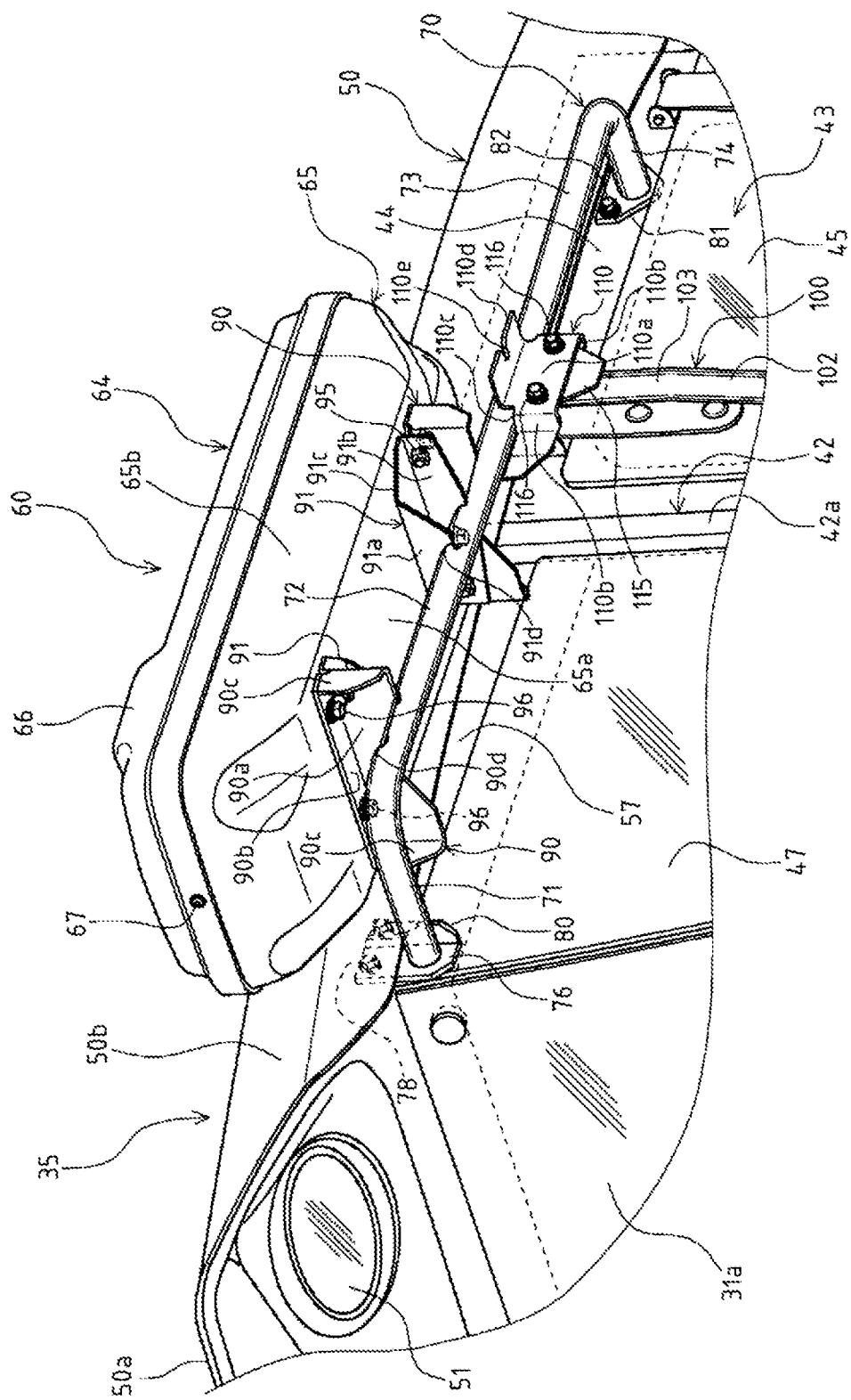
FIG. 11 is a bottom perspective view showing the antenna unit and its support configuration according to the embodiment of the present invention.

The support configuration of the antenna unit 60 will be described using FIGS. 4 through 13. In FIGS. 7, 8, and 10, a part of the roof panel 50 is shown in a cutout state. In addition, in FIG. 10, a part is shown in cross-section.

The combine harvester 1 has a support frame 70 as a support member for supporting the antenna unit 60. The support frame 70 is a frame part made of a round pipe-shaped member having a predetermined bent or curved shape, and is provided on the cabin left side face part 37.

The support frame 70 is configured to extend back and forth. The support frame 70 makes its major part, except for the front and rear ends, as a frame body part extending in an approximately front-back direction. The support frame 70 has, in order from front to rear, a front fixing part 71, a front-rear extension part 72, an inclination part 73, and a rear fixing part 74 as a bent-shaped part made of a pipe-shaped member.

The front fixing part 71 is a part with the left-right direction as its axis direction, and a part extending from the cabin left side face part 37 toward the left. The right side end part of the front fixing part 71 is the front side end part of the support frame 70.

The front-rear extension part 72 is a part with the front-back direction as its axial direction, and a part horizontally extending from the left end part of the front fixing part 71 toward the rear to form a right-angled corner part together with the front fixing part 71. The corner part between the front-rear extension part 72 and the front fixing part 71 is a curved part.

The inclination part 73 is a part with a direction of inclination, which is backward and upward in the side view and is inclined from the left-right outer side (left side) toward the left-right inner side (right side) gradually from the front side to the rear side in the plan view, as its axial direction. The inclination part 73 is a part that extends toward obliquely backward upper right from the rear end part of the front-rear extension part 72 to form an obtuse corner part together with the front-rear extension part 72 in the side view and plan view.

In the side view, the angle formed by the inclination part 73 and the front-rear extension part 72 is, for example, about 170 degrees. In addition, in the plan view, the angle formed by the inclination part 73 and the front-rear extension part 72 is, for example, about 170 degrees.

The rear fixing part 74 is a part with the left-right direction as its axial direction, and a part extending horizontally toward the right from the rear end part of the inclination part 73 to form an obtuse corner part together with the inclination part 73. In the plan view, the angle formed by the inclination part 73 and the rear fixing part 74 is, for example, about 100 degrees. The corner part between the inclination part 73 and the rear fixing part 74 is a curved part. The right side end part of the rear fixing part 74 is the rear side end part of the support frame 70.

In the support frame 70, the front-rear extension part 72 and the inclination part 73 form the frame body part extending in the approximately front-back direction. In the left side view, the support frame 70 is positioned below and near the lower edge part of the left side face part 50b of the roof panel 50, and is provided along the left side face part 50b of the roof panel 50.

The support frame 70 is provided in such a state that its front and rear end parts are fixed to the cabin left side face part 37. That is, the support frame 70 is provided in a state where the right side end part of the front fixing part 71, which serves as the front end part, and the right side end part of the rear fixing part 74, which serves as the rear end part, respectively, are fixed to the cabin left side face part 37.

The front side end part of the support frame 70 is positioned at the cabin left side face part 37, near the upper end part of the front upper face part 31a that constitutes the front face part 31. The front side end part of the support frame 70 is fixed to the front upper side plate 57, which constitutes the front upper part of the cabin left side face part 37, via a front mounting plate 76.

The front mounting plate 76 is a plate-shaped member having an approximately rectangular outer shape, and is fixed to the front upper side plate 57 with a plate thickness direction as the left-right direction and the longitudinal direction as the up-down direction. The front mounting plate 76 is fixed to a mounting seat 77, which is fixed to the front upper side plate 57, by fixing bolts 78. In other words, the front mounting plate 76 is fixed to the front upper side plate 57 via the mounting seat 77.

The mounting seat 77 is a metal fitting having an upper face part and a lower face part, which are parallel to each other, and a left side face part, and forming an approximately "U" shape with the right side (front upper side plate 57 side) as an open side in the front view (see FIG. 8), and is fixed to the front upper side plate 57 by welding or other means. The mounting seat 77 has approximately the same dimensions as the front mounting plate 76 in the front-back direction. In the mounting seat 77, the left side face part is the face part that receives an attachment of the front mounting plate 76.

The front mounting plate 76 is fixed to the mounting seat 77 at two, front and rear, locations by the fixing bolts 78. The fixing bolts 78 pass through the left side face part of the front mounting plate 76 and the mounting seat 77, and are screwed into nut parts 79 provided on the back (right) side of the left side face part. Fixing parts formed by the fixing bolts 78 are positioned near the front and rear corner parts of the upper part of the front mounting plate 76. The front mounting plate 76 has its upper part fixed to the mounting seat 77 by fixing bolts 78, and its lower part extends downward from the mounting seat 77.

The lower part of the front mounting plate 76 is positioned near the left and right outer sides (left side) relative to the front upper side corner part of the left front window part 47. The right end part of the front fixing part 71 of the support frame 70 is fixed to the lower part of the front mounting plate 76. The right end part of the front fixing part 71 is fixed to the front mounting plate 76 by welding or other means, while fitting into a circular opening part 76a formed in the lower part of the front mounting plate 76.

A reinforcement plate 80 is provided between the front mounting plate 76 and the support frame 70. The reinforcement plate 80 is a plate-shaped member having approximately the same dimensions as the front mounting plate 76 in the up-down direction, and is provided on the rear side of the front fixing part 71 in an orientation with the front-back direction as the plate thickness direction.

The reinforcement plate 80 is provided so that it projects vertically to the left with respect to the front mounting plate 76 at a position in the intermediate part of the front mounting plate 76 in the front-back direction. The reinforcement plate 80 is fixed to the front mounting plate 76 by welding or other means, and is also fixed to the right end part of the front fixing part 71 by welding or other means. The reinforcement plate 80 has a bulging shape for the part fixed to the front fixing part 71, whose dimensions in the left-right direction are longer than those of the other parts.

The front fixing part 71 of the support frame 70 is fixed to the front mounting plate 76 and opposes to a part extending downward from the left side face part 50b of the roof panel 50. The fixing part of the front mounting plate 76 by fixing bolts 78 to the front upper side plate 57 is covered from the left by the left side face part 50b of the roof panel 50. Therefore, the fixing part of the front mounting plate 76 to the front upper side plate 57 is a part hidden by the left side face part 50b of the roof panel 50 in the left side view.

The rear side end part of the support frame 70 is positioned above the rear part of the left rear window part 43 in the cabin left side face part 37. The rear side end part of the support frame 70 is fixed to the upper end part of the left side plate 44, which constitutes the rear part of the cabin left side face part 37, via a rear mounting plate 81.

The rear mounting plate 81 is a plate-shaped member having an approximately truncated isosceles triangular outer shape, and is fixed to the left side plate 44 with the plate thickness direction as the left-right direction and the top part side as the lower side. The rear mounting plate 81 is fixed to the left side plate 44 by fixing bolts 82.

The rear mounting plate 81 is fixed to the left side plate 44 at two, front and rear, locations by the fixing bolts 82. The fixing bolts 82 pass through the left side plate 44 and are screwed into unshown female thread parts provided on the back (right) side of the left side plate 44. Fixing parts formed by the fixing bolts 82 are positioned near the front and rear corner parts of the upper part of the rear mounting plate 81.

The right end part of the rear fixing part 74 of the support frame 70 is fixed to the lower part of the rear mounting plate 81. The right end part of the rear fixing part 74 is fixed to the rear mounting plate 81 by welding or other means in a state of being fitted into a circular opening part 81a formed in the lower part of the rear mounting plate 81.

The rear fixing part 74 of the support frame 70 is fixed to the rear mounting plate 81 and opposes to a part extending downward from the left side face part 50b of the roof panel 50. The upper parts of the fixing parts of the rear mounting plate 81 by the fixing bolts 82 to the left side plate 44 are covered from the left by the left side face part 50b of the roof panel 50. Therefore, the upper part of the fixing part of the rear mounting plate 81 to the left side plate 44 is a part hidden by the left side face part 50b of the roof panel 50 in the left side view.

With respect to the support frame 70, which is fixedly supported against the cabin 30 as described above, the antenna unit 60 is supported on top of the front part of the support frame 70. The antenna unit 60 is supported by two support brackets 90, which are provided at two, front and rear, locations in the front-rear extension part 72 of the support frame 70, in a fixed state. The front side support bracket 90 is, with respect to the support frame 70, provided near a corner part formed by the front fixing part 71 and the front-rear extension part 72, and the rear side support bracket 90 is provided in a front-rear intermediate part of the front-rear extension part 72.

The support bracket 90 is fixed to a mounting bracket 91 that is fixed to the support frame 70. In other words, the support bracket 90 is provided to the support frame 70 via a mounting bracket 91. The support bracket 90 and the mounting bracket 91 are configured to be laterally symmetrical or substantially laterally symmetrical with the axis center position of the front-rear extension part 72 of the support frame 70 as a center. In addition, the front and rear support brackets 90 and mounting brackets 91 pairs are configured to be symmetrical or substantially symmetrical with respect to the front-back direction.

The mounting bracket 91 is a longitudinal member in the form of a bent plate-shaped member, and is provided at the upper side of the front-rear extension part 72, with the longitudinal direction as the left-right direction and orthogonal to the axial direction of the front-rear extension part 72 in the plan view. The mounting bracket 91 has a front face part 91a and rear face part 91b, which are parallel to each other, and an upper face part 91c, and these face parts form an approximately "U" shape with the lower side as an open side in the side view.

At the lower sides of the left-right central part of the front face part 91a and rear face part 91b of the mounting bracket 91, semicircular notched parts 91d are formed for fitting the front-rear extension part 72. The mounting bracket 91 is fixed to the front-rear extension part 72 by welding or other means, in a state that the front-rear extension part 72 is fitted into the notched parts 91d of the front face part 91a and rear face part 91b. With respect to the longitudinal direction, the mounting bracket 91 has a dimension that is shorter than the dimension of the case 64 of the antenna unit 60 in the width direction (left-right direction), and longer than half of the same dimension.

The support bracket 90 is a longitudinal member in the form of a bent plate-shaped member, and is provided at the upper side of the front-rear extension part 72, with the longitudinal direction as the left-right direction and orthogonal to the axial direction of the front-rear extension part 72 in the plan view. The support bracket 90 has approximately the same length as the mounting bracket 91.

The support bracket 90 has a fixing face part 90a with the front-back direction as the plate thickness direction, a support face part 90b in a horizontal shape, which is formed by bending at right angles from the upper end of the fixing face part 90a, and left and right side face parts 90c, which are formed by bending at right angles from the left and right ends of the fixing face part 90a. In the support bracket 90, the support face part 90b is a face part that receives an attachment of the case 64 of the antenna unit 60. The support face part 90b is positioned at approximately the same height as the upper face part 91c of the mounting bracket 91.

The front side support bracket 90 is fixed to the mounting bracket 91 at two locations of both the left and right ends by fixing bolts 92, in a state where the fixing face part 90a is oriented to the rear side, and positioned on the front side of the mounting bracket 91, and the fixing face part 90a is overlapped with the front face part 91a of the mounting bracket 91. The fixing bolts 92 pass through the fixing face part 90a and the front face part 91a, and are screwed into nut parts 93 provided on the rear side of the front face part 91a of the mounting bracket 91.

The rear side support bracket 90 is fixed to the mounting bracket 91 at two locations of both the left and right ends by fixing bolts 94, in a state where the fixing face part 90a is oriented to the front side, and positioned on the rear side of the mounting bracket 91, and the fixing face part 90a is overlapped with the rear face part 91b of the mounting bracket 91. The fixing bolts 94 pass through the fixing face part 90a and the rear face part 91b, and are screwed into nut parts 95 provided on the front side of the rear face part 91b of the mounting bracket 91.

At the lower side of the left-right central part of the fixing face part 90a of the support bracket 90, a semicircular notched part 90d is formed for fitting the front-rear extension part 72. The support bracket 90 has, at the left-right intermediate part of the lower side, an inverted V-shaped concave shape with the notched part 90d positioned in the center part. By fitting the front-rear extension part 72 into the notched part 90d, the lower edges of both the left and right sides of the support bracket 90 are positioned lower than the front-rear extension part 72.

Against these front and rear support brackets 90, the case 64 of the antenna unit 60 is fixed to the support face part 90b by fixing bolts 96. Fixing parts formed by the fixing bolts 96 is provided in each support bracket 90 at two locations of both the left and right sides. For this reason, in the support face part 90b of the support bracket 90, two holes 90e are formed at two locations of both the left and right sides for the fixing bolts 96 to pass through (see FIG. 9). Thus, the antenna unit 60 is fixed to the front and rear support brackets 90 at a total of four locations, two at each bracket, by fixing bolts 96.

In the antenna unit 60, female threaded parts 97 are provided in the case 64 to receive the screw insertion of the fixing bolts 96. The female threaded parts 97 each are composed of a cylindrical member having a threaded hole and is fixed to the case 64 so that the threaded hole is opened facing the bottom face part 65a of the lower case body 65 of the case 64. The female threaded parts 97 are provided at four locations corresponding to the fixing parts formed by the fixing bolts 96. In this configuration, the fixing bolts 96 pass through the support face part 90b of the support bracket 90 from the lower side, and are screwed into the female threaded parts 97 to fix the case 64 to the support bracket 90.

The antenna unit 60 is provided in a state where it is supported on the upper side of the approximate front half part of the support frame 70. Specifically, the antenna unit 60 is provided with respect to the support frame 70 at a position where, in the plan view, the left-right center of the outer shape of the case 64 coincide or approximately coincide with the axial center position of the front-rear extension part 72. In addition, the antenna unit 60 has, with respect to the front-back direction, the front end part of the case 64 positioned forward of the front fixing part 71 and the rear end part of the case 64 positioned forward of a bend part formed by the front-rear extension part 72 and the inclination part 73.

A handrail part 100 is provided to the configuration described above, where the antenna unit 60 is supported by the support frame 70 at the left upper part of the cabin 30. In other words, combine harvester 1 comprises a handrail part 100 used to perform work on the antenna unit 60. The handrail part 100 is constituted of a round pipe-shaped member having a predetermined bent or curved shape, and is provided on the cabin left side face part 37 of the cabin 30.

The handrail part 100 is configured to extend up and down. The handrail part 100 makes its major part, except for the upper and lower ends, as a handrail body part extending in the up-down direction in the side view. The handrail part 100 has, in order from the lower side to the upper side, a lower fixing part 101, an inclined extension part 102, and an upper fixing part 103, as a bent-shaped part made of a pipe-shaped member.

The lower fixing part 101 is a part with the left-right direction as the axis direction, and a part extending from the cabin left side face part 37 toward the left. The right side end part of the lower fixing part 101 is the lower side end part of the handrail part 100.

The inclined extension part 102 is a part with an axial direction that is along the up-down direction in the side view and inclined from the left-right inner side (right side) toward the left-right outer side (left side) gradually from the lower side to the upper side in the front view. The inclined extension part 102 is a part that extends obliquely upward to the left to form an obtuse corner part together with the lower fixing part 101 in the front view. In the front view, the angle formed by the axial direction of the inclined extension part 102 is, for example, about 5 to 10 degrees. The corner part between the inclined extension part 102 and the lower fixing part 101 is a curved part 104.

The upper fixing part 103 is a part with the up-down direction as the axial direction, and a part extending upward from the upper end part of the inclined extension part 102 to form an obtuse corner part together with the inclined extension part 102. The upper end part of the upper fixing part 103 is the upper side end part of the handrail part 100.

In the handrail part 100, the inclined extension part 102 and the upper fixing part 103 form the handrail body part that extends in the up-down direction in the side view. The inclined extension part 102, which forms the majority of the handrail body part, is a part of the handrail part 100 that is primarily grasped by a worker. The handrail part 100 is provided so that it overlaps the upper part of the left pillar part 42 that constitutes the cabin left side face part 37 in the left side view. The handrail part 100 is provided over more than half of the cabin left side face part 37 with respect to the up-down direction. Specifically, the handrail part 100 has its upper end part positioned at approximately the same height as the upper end of the front upper face part 31a of the cabin 30, and has its lower end part positioned at a height lower than the lower end of the front upper face part 31a.

The handrail part 100 is provided in a state where its upper end part is connected to the support frame 70 and its lower end part is fixed to the cabin left side face part 37. In other words, the handrail part 100 is provided in a state where the upper end part of the upper fixing part 103, which serves as the upper end part, is connected to and supported by the support frame 70, and the right side end part of the lower fixing part 101, which serves as the lower end part, is fixed to the cabin left side face part 37.

The upper end part of the handrail part 100 is connected to the support frame 70 via an upper support bracket 110 that is an upper side connecting member fixed to the support frame 70. The upper support bracket 110 is provided at the lower side of the support frame 70 to a part of the support frame 70, which is between the rear side support bracket 90 and a corner part formed by the front-rear extension part 72 and the inclination part 73.

The upper support bracket 110 is a member in a form of a plate-shaped member bent and formed into a predetermined shape. The upper support bracket 110 has an approximately rectangular fixing face part 110a with the left-right direction as the plate thickness direction, and front and rear side face parts 110b bent at a right angle from the front and rear end parts of the fixing face part 110a toward the left-right inner side (right side), and these face parts form an approximately "U" shape with the right side as an open side in a top view. In the upper support bracket 110, the fixing face part 110a is the face part that receives an attachment of the upper end part of the handrail part 100.

On each left side of the upper part of the front and rear side face parts 110b of the upper support bracket 110, a concave notched part 110c is formed for fitting the front-rear extension part 72 of the support frame 70. The upper support bracket 110 is fixed to the front-rear extension part 72 by welding or other means, in a state that the front-rear extension part 72 positioned in the notched parts 110c of the front and rear side face parts 110b. The upper support bracket 110 has the upper edge part of the fixing face part 110a positioned on the left of the front-rear extension part 72.

The handrail part 100 has the upper end part of the upper fixing part 103 fixed to the upper support bracket 110 via a fixing plate 115. The fixing plate 115 is a plate-shaped member having an approximately truncated isosceles triangular outer shape, and is oriented with the plate thickness direction as the left-right direction and the top part side as the lower side. The fixing plate 115 is fixed to the left side of the upper end part of the upper fixing part 103 by welding or other means.

The fixing plate 115 is fixed to the fixing face part 110a at two, front and rear, locations by fixing bolts 116, in a state that the fixing plate 115 overlaps the fixing face part 110a of the upper support bracket 110 from the back side (right side). The fixing bolts 116 pass through the fixing face part 110a and the fixing plate 115 and are screwed into nut parts 117 provided on the back side (right side) of the fixing plate 115.

Fixing parts formed by the fixing bolts 116 are positioned near the front and rear corner parts of the upper part of the fixing plate 115.

The upper support bracket 110 and the fixing plate 115 for connecting the handrail part 100, as well as the upper end part of the handrail part 100 to the support frame 70 are configured to be laterally symmetrical or substantially laterally symmetrical with the axis center position of the upper support bracket 110 along the up-down direction in the left side view as a center. In addition, in the left side view, the handrail part 100 is entirely positioned within the range of the width (front-back direction dimension) of the left pillar part 42 that constitutes the cabin left side face part 37.

Figure 12:
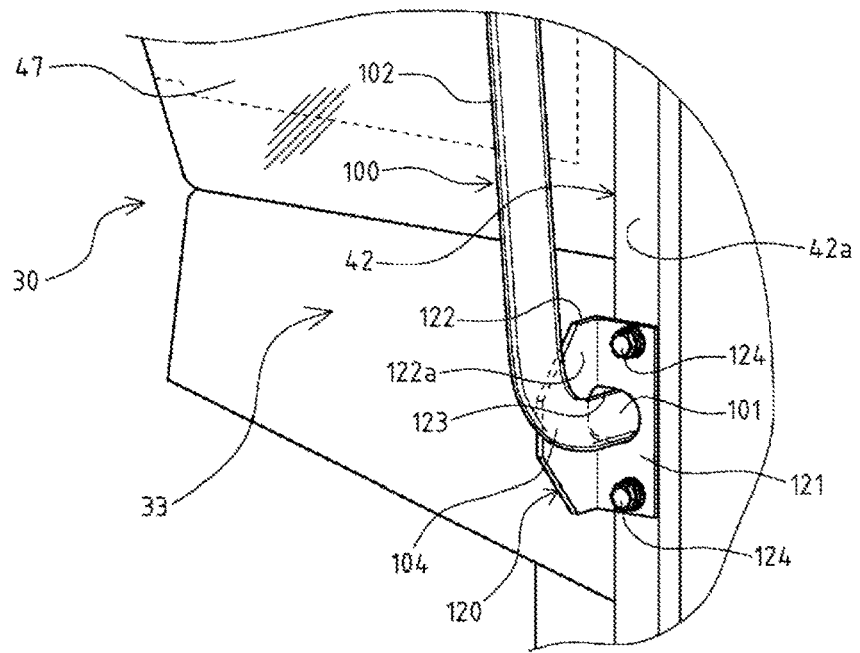
FIG. 12 is a rear perspective view showing a support configuration of a lower part of a handrail part according to the embodiment of the present invention.

The lower end part of the handrail part 100 is fixed to the left pillar part 42, which constitutes the cabin left side face part 37, via a lower support bracket 120, which is a mounting member. The lower support bracket 120 is a mounting fitting that has an approximately "L" shaped bend shape, as shown in FIG. 12. The lower support bracket 120 has a fixing face part 121 and a support face part 122 as the face parts forming the bend shape.

The lower support bracket 120 is fixed to the left pillar part 42 at two, upper and lower, locations by fixing bolts 124, in a state where the fixing face part 121 is along the left side face 42a of the left pillar part 42, with the up-down direction as the longitudinal direction. The fixing bolts 124 pass through the fixing face part 121 and the left face part of the left pillar part 42 that forms the left side face 42a, and are screwed into unshown nut parts provided on the back side of this left face part. The support face part 122 protrudes from the front side of the fixing face part 121 toward the left, with the front-back direction as the plate thickness direction.

In the lower support bracket 120, a through-shaped opening part 123 is formed in the center part of the bracket 120 in the up-down direction. The opening part 123 is formed in a manner in which a corner part formed by the fixing face part 121 and the support face part 122 is notched. With respect to the portion of the formation relative to the fixing face part 121, the opening part 123 has a part along a circular shape corresponding to the outer shape of the lower fixing part 101 in a left side view, which is an axial view of the lower fixing part 101 of the handrail part 100. In the fixing face part 121, fixing parts formed by the fixing bolts 124 are provided on both upper and lower sides of the opening part 123.

With respect to the lower support bracket 120 as described above, the handrail part 100 is fixed to the lower support bracket 120 by welding or other means, in a state that the tip end part of the lower fixing part 101 is fitted into the opening part 123 in the fixing face part 121, and the lower fixing part 101 and a part of the curved part 104 are positioned on the rear face 122a side of the support face part 122. The welding portions of the handrail part 100 with respect to the lower support bracket 120 are, for example, a fitting part of the lower fixing part 101 to the opening part 123 and contact parts of the lower fixing part 101 and the curved part 104 with respect to the rear face 122a of the support face part 122.

As described above, the handrail part 100 is connected and supported at the upper end to the support frame 70 and at the lower end to the cabin left side face part 37, and thus the handrail part 100 is provided in a state of being bridged between the support frame 70 and the cabin left side face part 37.

In the configuration of the handrail part 100 with respect to the support frame 70 of the antenna unit 60 as described above, the antenna unit 60 and the handrail part 100 are arranged so that they are positioned in front of and behind each other in the plan view.

Figure 6:
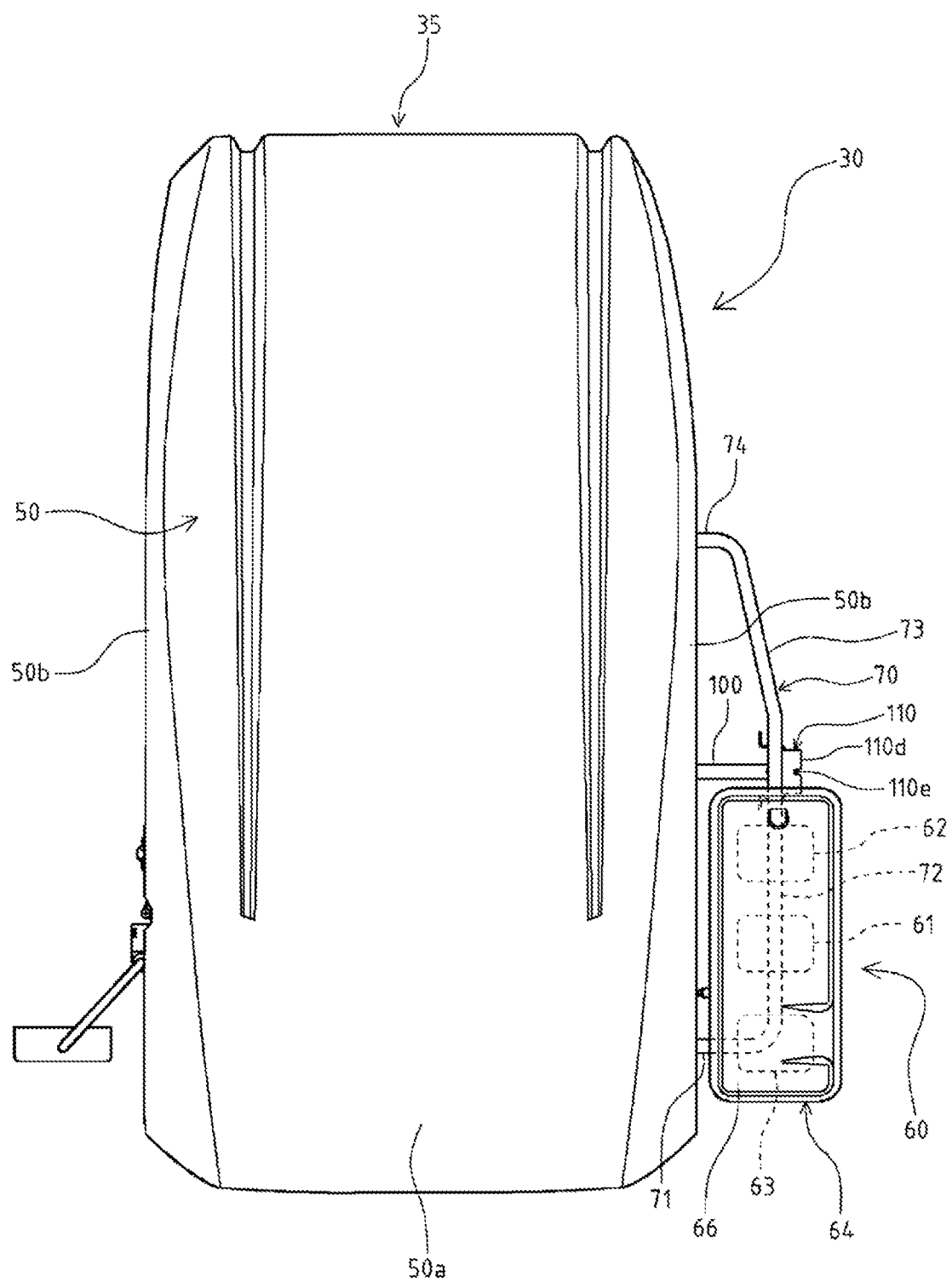
FIG. 6 is a plan view of the cabin according to the embodiment of the present invention.

As shown in FIG. 6, in this embodiment, the handrail part 100 is positioned behind the antenna unit 60 with respect to the front-back direction. The antenna unit 60 and the handrail part 100 are positioned side-by-side in the front-back direction. Specifically, the handrail part 100, which is extended along the left-right direction in the plan view, is positioned near behind the rear end of the case 64 with respect to the antenna unit 60.

In this embodiment, the handrail part 100 is positioned behind the antenna unit 60 with respect to the front-back direction, but the arrangement such that they are positioned in front of and behind each other in the plan view is not limited to this embodiment. For example, the handrail part 100 positioned below the antenna unit 60 may be arranged such that a part of the handrail part 100 (front side part) overlaps the rear end part of the antenna unit 60 in the plan view.

In addition, the handrail part 100 is constituted of metal components. Specifically, the handrail part 100 is constituted of steel pipe having a circular cross-sectional shape. The handrail part 100 is provided so that its upper end is positioned at a height below the antenna unit 60.

As shown in FIG. 7, the upper end of the handrail part 100 is positioned below the upper end of the fixing plate 115. The upper end of the fixing plate 115 is positioned below the upper end of the fixing face part 110a in the upper support bracket 110. The upper support bracket 110 is positioned below the upper end of the front-rear extension part 72 of the support frame 70. The antenna unit 60 is provided above the front-rear extension part 72 via the support bracket 90, in a state that the bottom face part 65a of the case 64 is supported by the support bracket 90 provided on the upper side of the front-rear extension part 72.

Thus, the upper end of the handrail part 100 is positioned below the bottom face part 65a, which is the lower face part of the antenna unit 60. The upper end of the handrail part 100 is the horizontal opening end face of the steel pipe that constitutes the handrail part 100.

Figure 13:
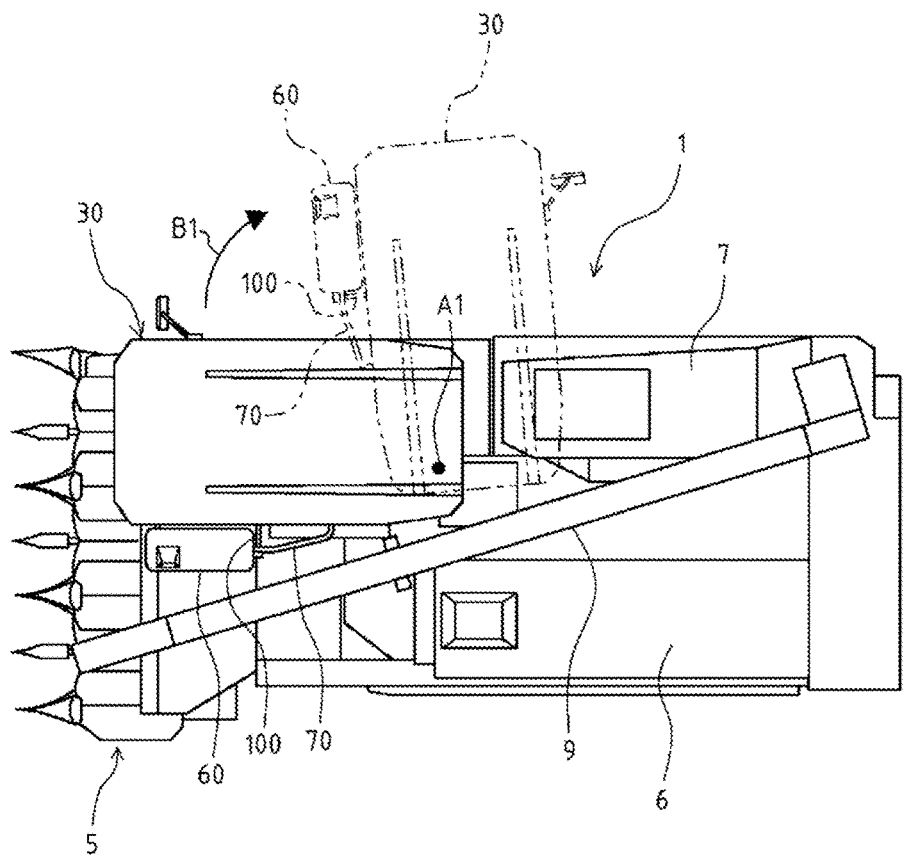
FIG. 13 is an explanatory diagram illustrating a rotation configuration of the cabin according to the embodiment of the present invention.

As shown in FIG. 13, the cabin 30 is provided to be rotatable around an opening and closing shaft A1, which is a shaft in the up-down direction with respect to the traveling machine body 4 so that the cabin 30 opens outward in the left-right direction of the machine body of the combine harvester 1. In the example shown in FIG. 13, the opening and closing shaft A1 is provided at a position near left at the rear part of cabin 30 in the plan view.

As shown in FIG. 13, the cabin 30 is provided to be rotatable within an approximate angular range of 90 degrees from the front-facing storage state to the right with an opening and closing shaft A1 as a center (see arrow B1). A state in which the cabin 30 is rotated from the storage state to the approximately 90 degrees rightward is an open state. In FIG. 13, the cabin 30 in the open state is shown in two dotted lines.

The rotary support part of the cabin 30 around the opening and closing shaft A1 comprises, for example, a pillar part erected on the traveling machine body 4 and a cylindrical shaft support part provided on the cabin 30 side and rotatably connected to the pillar part. The cabin 30 is fixed to the side of the traveling machine body 4 by a locking mechanism not shown in figure in each of the storage and open states. The cabin 30 in the open state facilitates inspection and repair of the engine 11 positioned below the cabin 30 and other equipment in the vicinity.

When the cabin 30 becomes an open state, the grain tank 7 becomes in a state (side-open state) in which the grain tank 7 is rotated outward around the axis of the vertical take-out conveyor 9b (see FIG. 1) of the discharging auger 9, so that the grain tank 7 opens its front side to the outside of the machine body from the normal storage state. This provides arrangement space for the cabin 30, which becomes an open state, and avoids interference of the cabin 30 with the grain tank 7. By rotating the grain tank 7 and opening it to the outside side of the machine (right side), the right side of the threshing part 6 and the installation space for the engine 11, etc. are opened. A locking device (not shown in Fig.) is provided for the grain tank 7 to fix the grain tank 7 in the storage position.

In the cabin 30, which is provided in such a way that it rotates outward in the width direction (left-right direction) of the machine body, the cabin left side face part 37, which is an installation face part of the antenna unit 60, the support frame 70, and the handrail part 100, is a side face part positioned inside in the left-right direction of the machine body out of the left and right side face parts of the cabin 30. In other words, the antenna unit 60, the support frame 70, and the handrail part 100 are provided to the cabin left side face part 37, which is a side face part opposite to the side that the cabin 30 opens out of the left and right side face parts of the cabin 30.

Thus, when the cabin 30 is rotated to the right side around the opening and closing shaft A1 to become an open state (see FIG. 13, arrow B1), the cabin left side face part 37 will face approximately forward or forward. In other words, the antenna unit 60, support frame 70, and handrail part 100 are positioned on the front side and become an opened state at the right of the machine body with respect to the cabin 30 rotated to the right side.

In addition, the combine harvester 1 comprises an auxiliary antenna 130 as an antenna for obtaining auxiliary information about the antenna unit 60. (see FIG. 7). The auxiliary antenna 130 is an antenna for obtaining GPS correction information in the automatic steering system of combine harvester 1 constituted by the antenna unit 60. The auxiliary antenna 130 is a straight bar-shaped member.

The auxiliary antenna 130 receives GPS correction information from antennas established independently, telecommunication carrier base stations such as telecommunication carriers, or fixed base stations established by local governments, etc., via communication means such as Internet lines, etc. The antenna unit 60 corrects the position information, which is received by the receiving device 61 from positioning satellites, with the inertial navigation device 62, etc. using the correction information received by the auxiliary antenna 130, and output (transmit) the position information of the machine by the wireless communication device 63, etc.

The auxiliary antenna 130 is provided at a connection part of the handrail part 100 with respect to the support frame 70. Specifically, an antenna support face part 110d, which is serves as a part supporting the auxiliary antenna 130, is provided on the upper support bracket 110, which is serves as a connecting member constituting the connection part of the handrail part 100 with respect to the support frame 70.

The antenna support face part 110d is, in the upper support bracket 110, a horizontal plate-shaped part that is formed by bending at a right angle toward the left from the upper end part of the fixing face part 110a. A notch-shaped support recess part 110e is formed at the front-rear center part of the left end part of the antenna support face part 110d. The support recess part 110e is a concave part with the left side as an open side, and is formed through the antenna support face part 110d in the plate thickness direction.

The antenna support face part 110d serves as a mounting seat for the auxiliary antenna 130, and the auxiliary antenna 130 is supported by the part of the support recess part 110e in a standing position. For example, as a fixing structure of the auxiliary antenna 130 to the antenna support face part 110d, as shown in FIG. 7, there is a structure in which a diameter enlarged flange part 131 is formed at a lower end part of the auxiliary antenna 130 while a male thread is formed at the lower side part of the flange part 131, and the antenna support face part 110d is held and fixed from above and below by the flange part 131 and a nut 132 screwed to the male thread. The height of the auxiliary antenna 130 is, for example, about such that the tip end (upper end) of the auxiliary antenna 130 is positioned at an upper-lower intermediate part of the case 64.

Thus, the auxiliary antenna 130 is provided directly above the handrail part 100 by mounting the auxiliary antenna 130 to the upper support bracket 110. The shape of the auxiliary antenna 130 and the configuration for fixing the auxiliary antenna 130 to the antenna support face part 110d is not particularly limited. In addition, the antenna supported by the upper support bracket 110 is not limited to the auxiliary antenna 130. The function and shape of the antenna is not limited as long as the antenna is used to obtain information about the antenna unit 60.

According to the combine harvester 1 of this embodiment with the configuration described above, in a configuration in which the antenna unit 60 is provided at a height position of the upper part of the cabin 30, the safety of work on the antenna unit 60 can be improved.

The combine harvester 1 comprises the handrail part 100 at the cabin left side face part 37. According to this configuration, during removing, or positioning such as adjusting height or maintaining the antenna unit 60, which is located high above the ground, etc. the worker can stabilize his/her body by grasping the handrail part 100 when working on the antenna unit 60, which is done while the worker is on a stand, stepladder, etc. This improves the safety of work. When working on the antenna unit 60, a space on the left front side of the cabin 30 is opened by making the reaping part 5 to side open, and this space is used as a set space for a stand, stepladder, etc., and as a work space for the worker.

In addition, with respect to the form of the handrail part 100, the handrail part 100 has a shape that inclines from the upper side to the lower side in the direction of getting close to the cabin left side face part 37 in the inclined extension part 102 that forms the majority of the handrail part 100. According to this configuration, for example, in comparison with a configuration in which a handrail part 100 has a handrail body part that is extended in an overall vertical shape, good gripping performance can be obtained, and the machine body can be made more compact by avoiding contact of the handrail part 100 with the rear part of the reaping part 5.

In addition, in combine harvester 1, the antenna unit 60 and the handrail part 100 are arranged side by side in the front-back direction. According to this configuration, the arrangement space for each of the antenna unit 60 and handrail part 100 is divided into front and back, and thus good gripping property to the handrail part 100 can be obtained. This makes the handrail part 100 easier to use and effectively improves the safety of working on the antenna unit 60 while on a stand or stepladder.

In this embodiment, the handrail part 100 is provided at the rear side of the antenna unit 60, but the front-back relationship between them may be reversed. In other words, the handrail part 100 may be positioned at the front side of the antenna unit 60 with respect to the front-back direction.

In the combine harvester 1, the support frame 70 supporting the antenna unit 60 is provided extending in the front-back direction, and the front and rear end parts of the support frame 70 are fixed to the cabin left side face part 37. The handrail part 100 is provided extending in the up-down direction, and its upper end part is connected to the support frame 70 and its lower end part is fixed to the cabin left side face part 37. This configuration allows the antenna unit 60 to be firmly supported against the cabin 30.

Specifically, as shown in FIG. 4, the support frame 70 supporting the antenna unit 60 is fixed and supported to the cabin left side face part 37 at two, front and rear, locations by a first fixing part on the upper front side formed by the front mounting plate 76, and a second fixing part on the upper rear side formed by the rear mounting plate 81. Furthermore, the lower end part of the handrail part 100, whose upper end part is connected to the front-rear intermediate part of the support frame 70, is fixed and supported to the cabin left side face part 37 by a third fixing part, which is formed by the lower support bracket 120.

Thus, as the support structure of the antenna unit 60 with respect to the cabin left side face part 37, a frame structure, in which the support frame 70 supported at the front and rear by the first and second fixing parts is supported from the lower side by the handrail part 100, whose one end side is supported by the third fixing part, is configured. According to this frame structure, the antenna unit 60 can be firmly supported to the cabin left side face part 37 in a well-balanced manner at three fixing parts positioned at the apexes of an inverted isosceles triangle in a left side view, i.e., the first fixing part, the second fixing part, and the third fixing part, thereby sufficient support strength can be obtained.

With respect to the form of the support frame 70, the support frame 70 has, at the rear part, an inclination part 73 that is inclined from the front side to the rear side in the direction of getting close to the cabin left side face part 37 in the plan view. According to this configuration, it is possible to avoid contact of the support frame 70 with the discharging auger 9 positioned near the left of the support frame 70 in the storage state. In the plan view, the extension direction of the inclination part 73 is approximately parallel to the extension direction of the discharging auger 9 in the storage state.

In the combine harvester 1, the cabin 30 is provided to rotate to the right side to open with respect to the traveling machine body 4, and the antenna unit 60 and handrail part 100 are provided on the cabin left side face part 37 opposite the side where the cabin 30 opens. According to this configuration, when the cabin 30 becomes an open state, the cabin left side face part 37 becomes facing forward, and the front side of the antenna unit 60 and the handrail part 100 becomes an open space. As a result, good workability can be obtained with respect to working on the antenna unit 60 while on a stand or stepladder, etc., thereby workability can be improved.

In addition, in the combine harvester 1, the handrail part 100 is constituted of metal components, and the upper end of the handrail part 100 is positioned below the antenna unit 60. According to this configuration, the strength of the handrail part 100 can be easily secured and good workability in the manufacture of the handrail part 100 can be obtained. In addition, it is possible to prevent the handrail part 100 from interfering with the reception of radio waves by the antenna unit 60, and to obtain good sensitivity for reception of radio waves at the antenna unit 60. This ensures the positioning accuracy of the combine harvester 1 by the antenna unit 60.

The combine harvester 1 also has the auxiliary antenna 130, and the support part of the auxiliary antenna 130 is provided on the upper support bracket 110, which constitutes the connection part of the upper side of the handrail part 100 with respect to the support frame 70. According to this configuration, compared to the case where the auxiliary antenna 130 is provided at the driving part 12 inside the cabin 30, since the auxiliary antenna 130 can be provided outside the cabin 30, good communication sensitivity can be obtained.

In addition, since the auxiliary antenna 130 can be provided using the connecting structure of the handrail part 100, the auxiliary antenna 130 can be provided using a simple configuration, without the need for a separate structure to support the auxiliary antenna 130. In addition, the connection part of the handrail part 100 with respect to the support frame 70, for example, is less susceptible to the vibration of the machine body than other parts of the support frame 70, so the auxiliary antenna 130 can be provided at a position that is advantageous to the swing of the auxiliary antenna 130. As described above, according to the configuration in which the auxiliary antenna 130 is erected at the connection part of the handrail part 100 with respect to the support frame 70, the positioning accuracy of the combine harvester 1 by the antenna unit 60 can be ensured with a simple configuration.

[Antenna Unit Configuration]

Figure 14:
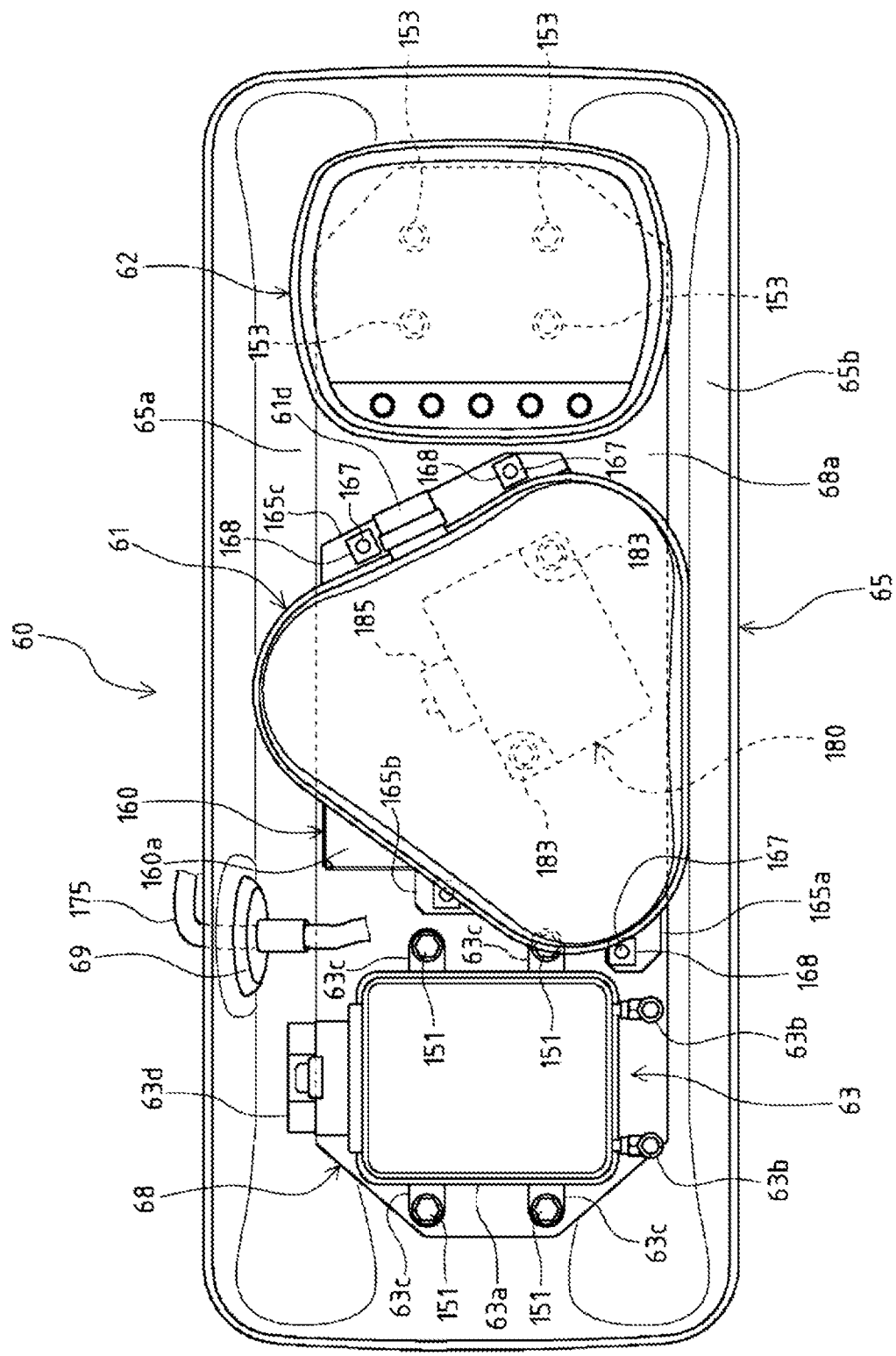
FIG. 14 is a plan view showing an internal configuration of the antenna unit according to the embodiment of the present invention.

A description will be made on a configuration of the antenna unit 60 with reference to FIGS. 14 through 18. In FIGS. 14 and 16, a state in which the upper case body 66 is removed is shown.

Figure 15:
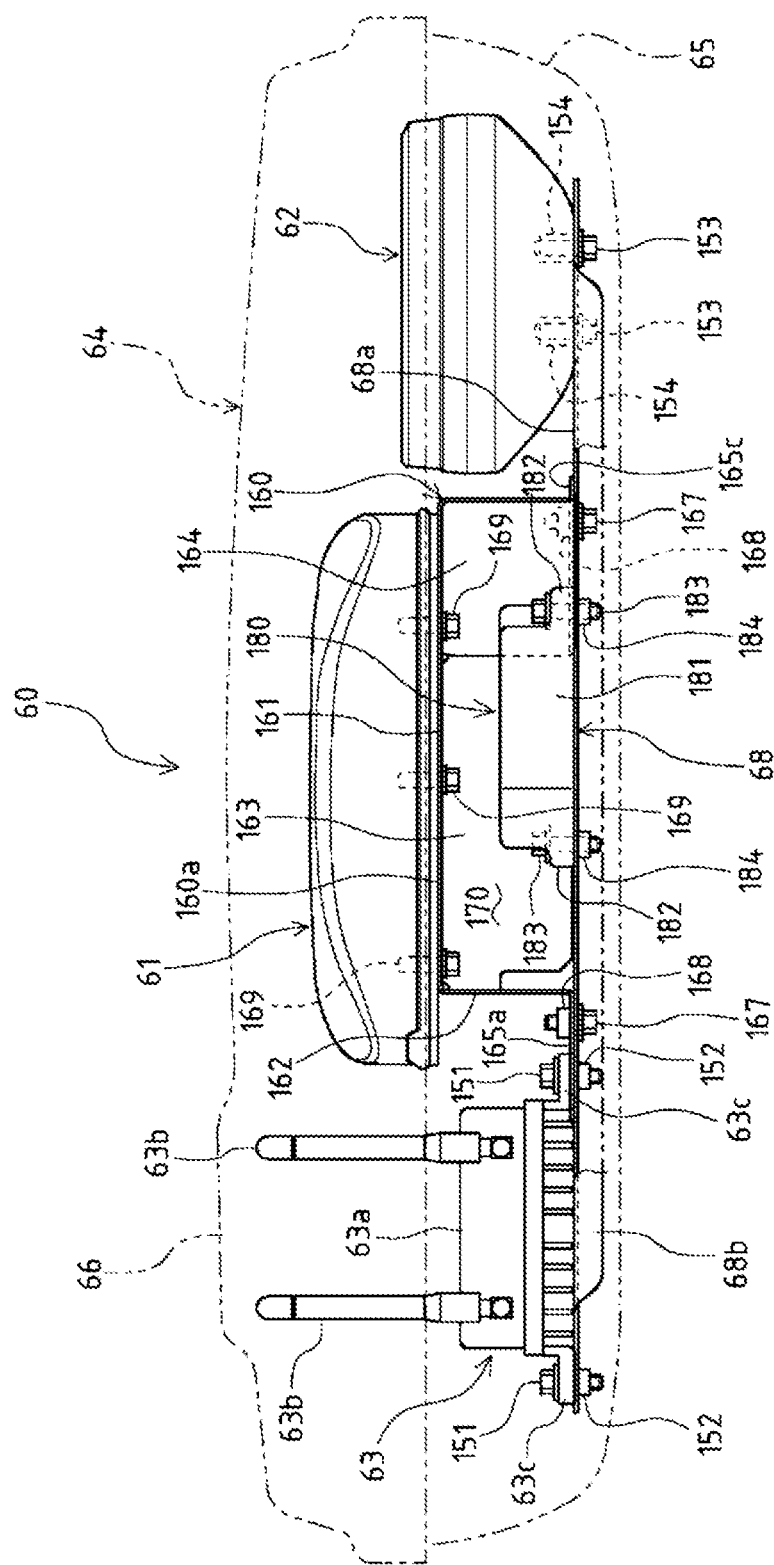
FIG. 15 is a left side view showing the internal configuration of the antenna unit according to the embodiment of the present invention.
Figure 16:
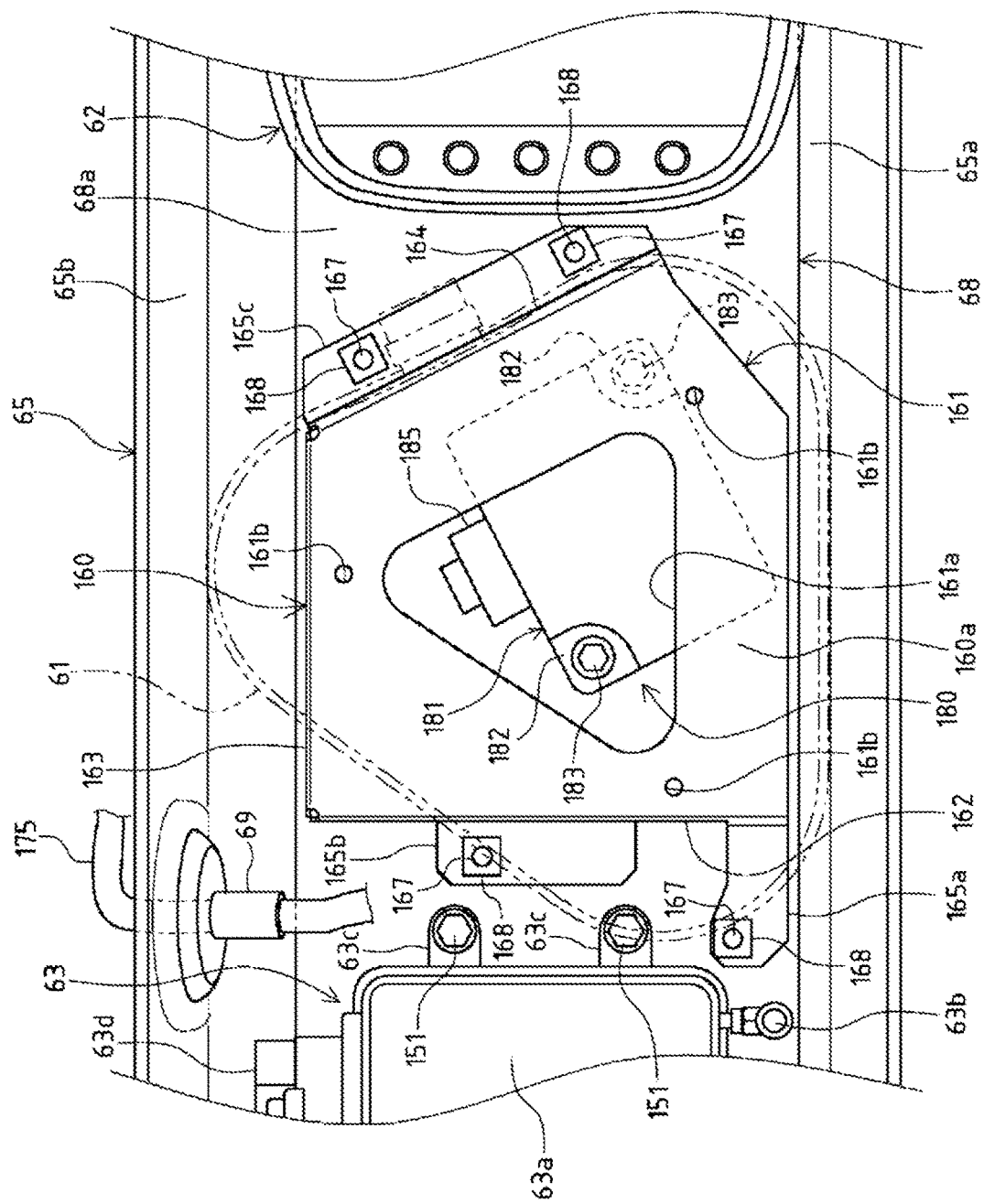
FIG. 16 is a partially enlarged plan view showing the internal configuration of the antenna unit according to the embodiment of the present invention.
Figure 17:
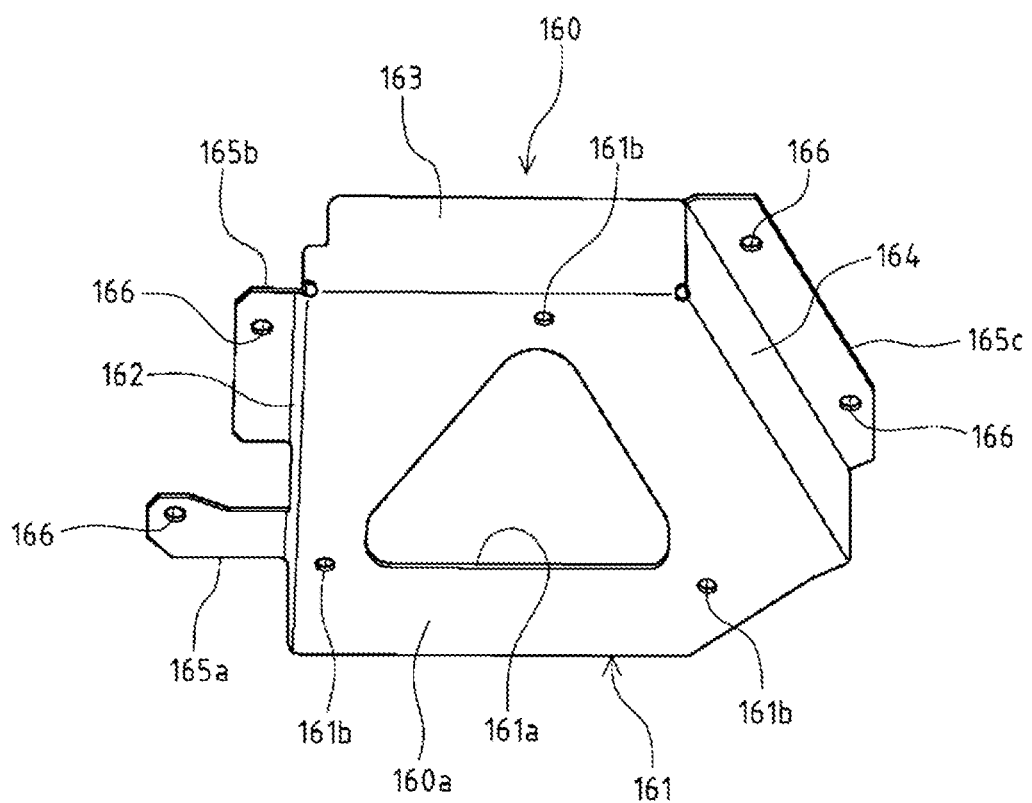
FIG. 17 is a perspective view showing an antenna support base of the antenna unit according to the embodiment of the present invention.

As shown in FIGS. 14 and 15, the antenna unit 60 has the wireless communication device 63, the receiving device 61, and the inertial navigation device 62 provided from the front side to the rear side. These devices are fixed to a horizontal plate-shaped device mounting plate 68 provided parallel to the bottom face part 65a in the case 64.

The device mounting plate 68 is provided to cover the approximately entire bottom face part 65a from the upper side inside the case 64, and has an approximately rectangular outer shape with the front-back direction as the longitudinal direction corresponding to the shape of the bottom face part 65a. The device mounting plate 68 has its upper face as a horizontal mounting face 68a that receives attachments of each device. Four corners of the device mounting plate 68 are chamfered inclined edge parts. In addition, a bent face part 68b for reinforcement, which is bent at a right angle downward to the horizontal body part of the device mounting plate 68 (see FIG. 15), is formed on the long edge parts of both sides of the device mounting plate 68 in the lateral direction (left-right direction). The device mounting plate 68 is a member made of metal, such as a steel plate, and is fixed to the bottom face part 65a of the lower case body 65 by bolts or other fixtures not shown in figure.

The wireless communication device 63 is provided on the front end part of the device mounting plate 68. The wireless communication device 63 comprises a body part 63a having an approximately rectangular outer shape, and two front and rear antenna parts 63b that are erected at the left side face part of the body part 63a. The wireless communication device 63 comprises, on both the front and rear sides of the body part 63a, fixing piece parts 63c for fixing the wireless communication device 63 to the device mounting plate 68.

The fixing piece parts 63c are plate-shaped parts protruding outward from the lower edge part of the body part 63a along the mounting face 68a.

The wireless communication device 63 is fixed to the device mounting plate 68 by bolts 151 that pass through the fixing piece parts 63c and the device mounting plate 68 from the upper side. The bolts 151 are screwed into nut parts 152 positioned on the lower side of device mounting plate 68. Fixing parts of the wireless communication device 63 formed by the fixing piece parts 63c are provided at a total of four locations, two on each side of the front and back of the body part 63a, one on the left and one on the right (see FIG. 14).

The inertial navigation device 62 is provided on the rear end part of the device mounting plate 68. The inertial navigation device 62 has an approximately rectangular outer shape in the plan view and an approximately inverted quadrilateral pyramid shape that is downwardly narrowed constriction at the lower part. The inertial navigation device 62 is placed on the device mounting plate 68 and is fixed to the device mounting plate 68 by bolts 153 that pass through the device mounting plate 68 from the lower side. The bolts 153 are screwed into female threaded parts 154 that are provided inside the inertial navigation device 62 and opened facing the bottom face of the inertial navigation device 62. Fixing parts formed by the bolts 153 are provided at a total of four locations, two on each side of the front and back, one on the left and one on the right (see FIG. 14).

The receiving device 61 has a flattened outer shape that forms an approximately rounded corner equilateral triangular shape in the plan view, and is provided in an orientation with one apex side on the right side and an edge part positioned on the left side along the front-back direction with respect to the plan view outer shape. The receiving device 61 is provided to the device mounting plate 68 via an antenna support base 160 in a front-rear intermediate part of the device mounting plate 68.

The antenna support base 160 is a box-shaped member made of a plate-shaped material bent and formed into a predetermined shape. The antenna support base 160 is fixed to the device mounting plate 68. The antenna support base 160 forms a support face 160a positioned at an upwardly spaced apart height relative to the device mounting plate 68 as a face for supporting the receiving device 61.

The antenna support base 160 has a horizontal upper face part 161 with the upper face as the support face 160a, a front face part 162 bent at a right angle downward from the front side edge part of the upper face part 161, a right side face part 163 bent at a right angle downward from the right side edge part of the upper face part 161, and a right rear side face part 164 bent at a right angle downward from the right rear side edge part of the upper face part 161.

The antenna support base 160 has fixing piece parts 165a, 165b, 165c for fixing the antenna support base 160 to the device mounting plate 68 on both front and rear sides. These fixing piece parts have predetermined shapes so that they do not interfere with other devices or other equipment mounted to the device mounting plate 68. The front side fixing piece parts 165a, 165b are plate-shaped parts protruding outward (front side) from the lower end part of the front face part 162 along the mounting face 68a. The rear side fixing piece part 165c is a plate-shaped part protruding outward (rear right side) from the lower end part of the right rear side face part 164 along the mounting face 68a.

The antenna support base 160 is fixed to the device mounting plate 68 by bolts 167 that pass through the device mounting plate 68 and each of the fixing piece parts 165a, 165b, and 165c from the lower side. The bolts 167 are screwed into nut parts 168 positioned on the upper side of the device mounting plate 68. Fixing parts of the antenna support base 160 formed by the bolts 167 are provided at a total of four locations, one at each of the front side fixing piece parts 165a and 165b, and two at the rear side fixing piece part 165c (see FIG. 16). Hole parts 166 for the bolts 167 to pass through are formed in each of the fixing piece parts 165a, 165b, and 165c (see FIG. 17).

An opening part 161a, which is a through hole part in the shape of an approximately equilateral triangle corresponding to the plan view outer shape of the receiving device 61, is formed in the upper face part 161 of the antenna support base 160. With respect to the antenna support base 160, the receiving device 61 is provided in a state where the receiving device 61 is placed on the support face 160a and fixed to the upper face part 161. The receiving device 61 is provided to cover the entire opening part 161a on the upper face part 161, and is fixed to the upper face part 161 by bolts 169. The bolts 169 pass through the upper face part 161 from the lower side and are screwed into female thread parts that are provided inside the receiving device 61 and opened facing the bottom face of the receiving device 61 (see FIG. 15). Fixing parts formed by bolts 169 are provided in the vicinity of each apex of the approximately equilateral triangle-shaped opening part 161a at three locations. Hole parts 161b for the bolts 169 to pass through are formed in the upper face part 161.

Thus, the antenna support base 160, which constitutes the pedestal of the receiving device 61 with respect to the device mounting plate 68, forms a space part 170 between the antenna support base 160 and the device mounting plate 68 (see FIG. 15). The space part 170 is a space part that is formed by the device mounting plate 68, the upper face part 161, the front face part 162, the right side face part 163, and the right rear side face part 164, with the left side open.

Cables (not shown in Fig.) including power supply lines and signal lines for receiving power supply are connected to each of the devices that the antenna unit 60 has, including the receiving device 61, the inertial navigation device 62, and the wireless communication device 63. In the wireless communication device 63, a connector 63d that receives a cable connection is provided at the right side face part of the body part 63a. In the receiving device 61, a connector 61d that receives a cable connection is provided at the rear side face part of the receiving device 61. In the inertial navigation device 62, a connector (not shown in Fig.) that receives a cable connection is provided at the right side face part.

A cable insertion part 69, which forms a guide hole part through which the cable passes, is provided at the right side face part of the front part among the peripheral wall part 65b of the lower case body 65. For example, the wiring of the cables in the antenna unit 60 can be configured so that the branch cables connected to the connectors of each device in the case 64 are aggregated into a single aggregated cable 175, and the aggregated cable 175 is extended to the outside of the case 64 through the cable insertion part 69. The aggregated cable 175 extended to the outside from the case 64 is connected to a predetermined cable extended from the machine side of the combine harvester 1. Thus, in the antenna unit 60, the cable extends to the outside from the left-right inner side of the case 64, i.e., from the cabin 30 side.

The antenna unit 60 has a converter 180 provided for the receiving device 61. The converter 180 is a DC/DC converter, which controls the voltage of DC power and converts DC power to DC power, and has functions for performing voltage conversion, stabilization, etc.

The converter 180 has a casing 181 that has an approximately rectangular outer shape, and is installed on the device mounting plate 68 in the space part 170 formed by the antenna support base 160. The converter 180 is in an orientation that is inclined at an approximate angle of 30 degrees with respect to the left-right direction in the plan view, and is provided so that the entire converter 180 is contained in the space part 170. The orientation of the installation of the converter 180 is not limited.

The converter 180 is fixed to the device mounting plate 68 by bolts 183 at plate-shaped fixing parts 182 notched in a pair of corners positioned diagonally in the plan view in the casing 181. The bolts 183 pass through the fixing parts 182 and device mounting plate 68, and are screwed into nut parts 184 that are positioned on the lower side of the device mounting plate 68.

Figure 18:
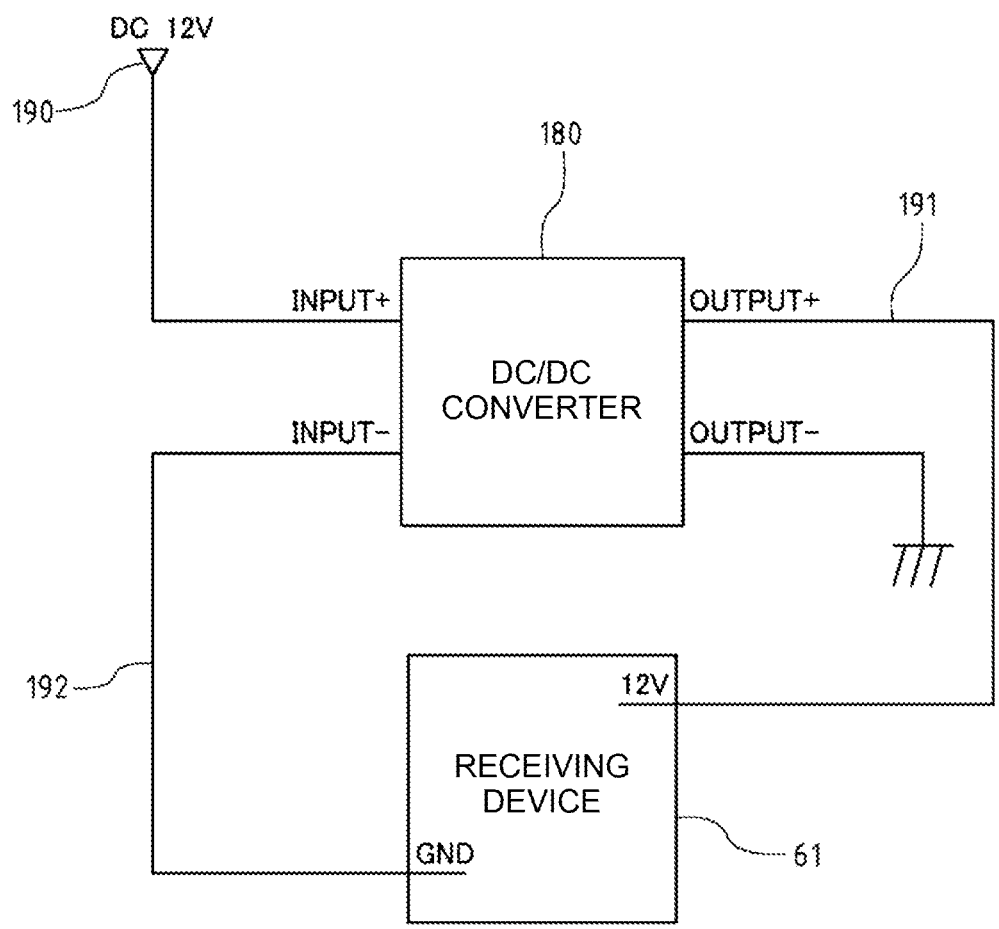
FIG. 18 is a figure showing a circuit configuration related to a receiving device in the antenna unit according to the embodiment of the present invention.

The converter 180 controls the power sent from the power supply to the receiving device 61. As shown in FIG. 18, converter 180 receives DC power supplied from a power supply part 190 such as an auxiliary equipment battery provided by the combine harvester 1, and boosts the voltage of this DC power to generate a high voltage. The DC power converted by the converter 180 is supplied to the receiving device 61.

The converter 180 has a first terminal, which is an input power supply terminal connected to the power supply part 190, and a second terminal, which is an output power supply terminal that receives a connection of an other end side of a first connecting line 191 whose one end side is connected to the receiving device 61. The converter 180 also has a third terminal, which is an input GND terminal that receives the connection of an other end side of a second connection line 192 whose one end side is connected to a GND of the receiving device 61, and a fourth terminal, which is an output GND terminal connected to a GND.

As shown in FIG. 16, the converter 180 has a connector 185 that includes first to fourth terminals. The connector 185 is provided at the right side face part of the casing 181 of the converter 180. The connector 185 is connected to a branch cable for the converter 180, which is branched from the aggregated cable 175 in the case 64.

As described above, according to the configuration of the antenna unit 60 with the converter 180 for the receiving device 61, sufficient voltage can be obtained and stabilized for the power supplied to the receiving device 61 by the voltage boosting action of the converter 180, etc., thereby good operating condition of the antenna unit 60 can be ensured.

For example, in a configuration where the power supply to the receiving device 61 is performed by an auxiliary battery for supplying power to various electronic devices provided by the combine harvester 1, it is difficult to obtain sufficient voltage for the power supplied to the receiving device 61. In particular, when the engine is started, a voltage drop due to cranking may cause a reset of the receiving device 61 (a reset of the antenna). In such cases, satellite positioning and azimuth information is sometimes reset and needs to be reconfigured to locate the satellite.

Therefore, by providing the converter 180 with a voltage booster function, the voltage for the power supplied to the receiving device 61 can be boosted and the voltage to the receiving device 61 can be stabilized. This can prevent problems such as resetting the antenna as described above so that the antenna unit 60 can be easy to use.

In the antenna unit 60, the converter 180 is provided within the space part 170 formed below the receiving device 61 by the antenna support base 160 on the device mounting plate 68. According to this configuration, the space inside the case 64 can be used effectively, and the cables and other connecting wires connected to the receiving device 61 and the converter 180 can be shortened. This allows the antenna unit 60 to be more compact.

In addition, by installing the receiving device 61 on the antenna support base 160, the receiving device 61 can be placed in a higher position relative to the inertial navigation device 62 and wireless communication device 63. This allows good sensitivity for radio waves reception at the antenna unit 60 and ensures positioning accuracy of the combine harvester 1 by the antenna unit 60.

Other Embodiments

Other embodiments of the support configuration of the antenna unit 60 will be described using FIGS. 19 through 21. Components that are common to those in the above-mentioned embodiment will be denoted by the same reference signs, and the description thereon will be omitted.

The configuration of this embodiment differs from the above-mentioned embodiment in that the position of the antenna unit 60 can be changed. The antenna unit 60 of this embodiment is provided to be repositionable with respect to its height position, which is its position in the up-down direction, between a first height position in which the entire antenna unit is positioned above a support frame 70 and a second height position in which at least a part of the antenna unit is overlapped with the support frame 70.

Figure 19:
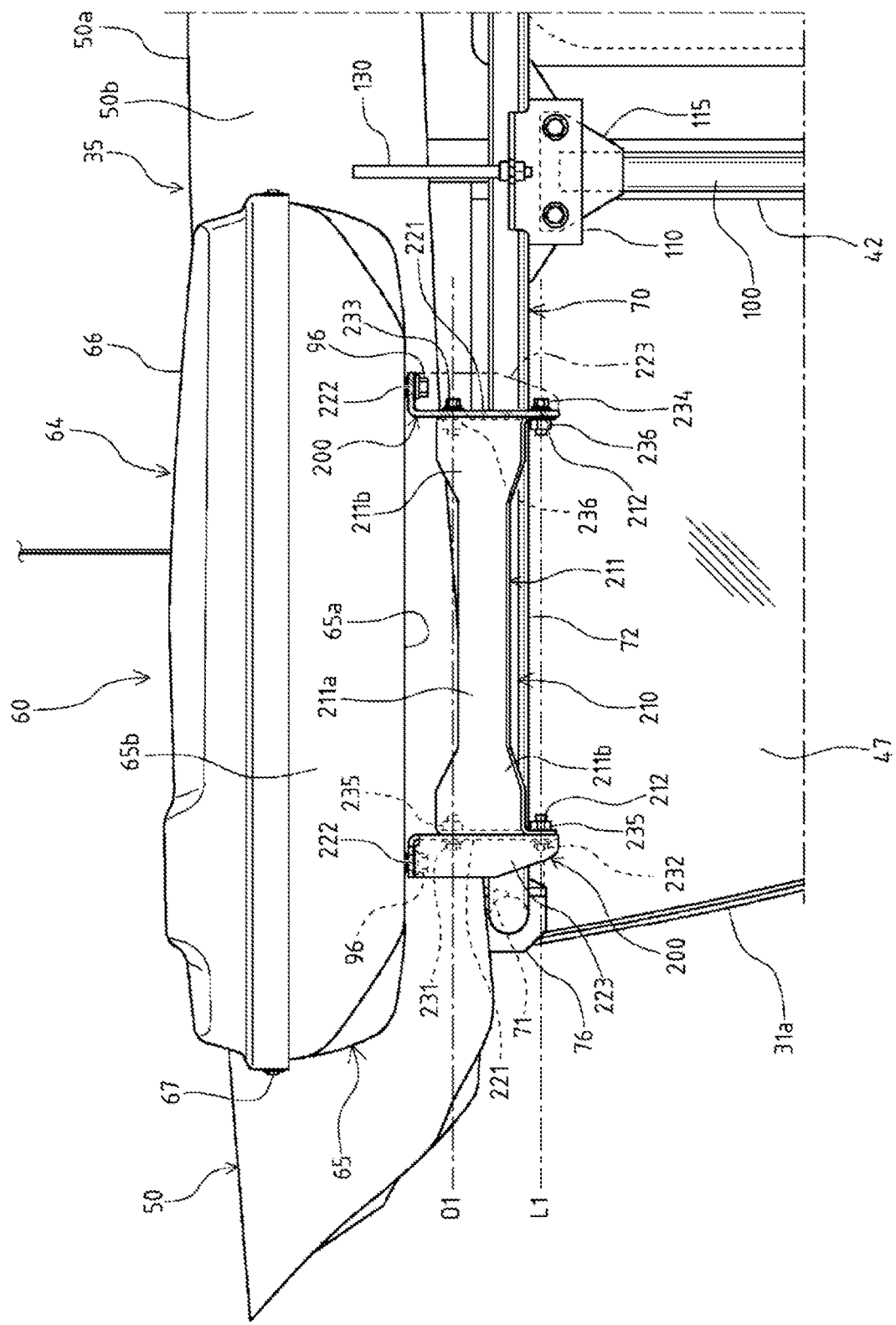
FIG. 19 is a left side view showing an antenna unit and its support configuration according to another embodiment of the present invention.
Figure 20:
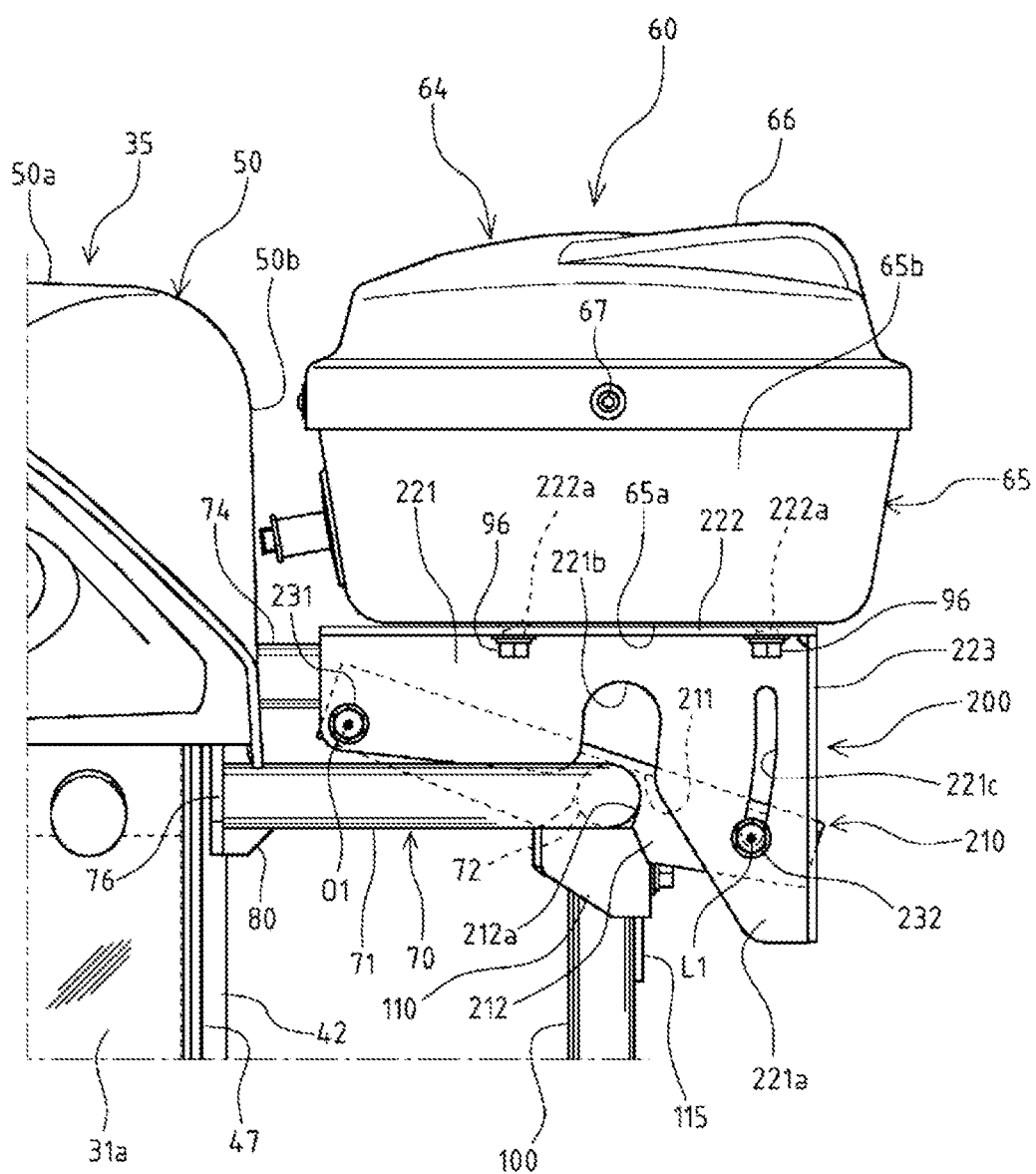
FIG. 20 is a front view showing the antenna unit and its support configuration according to the another embodiment of the present invention.
Figure 21:
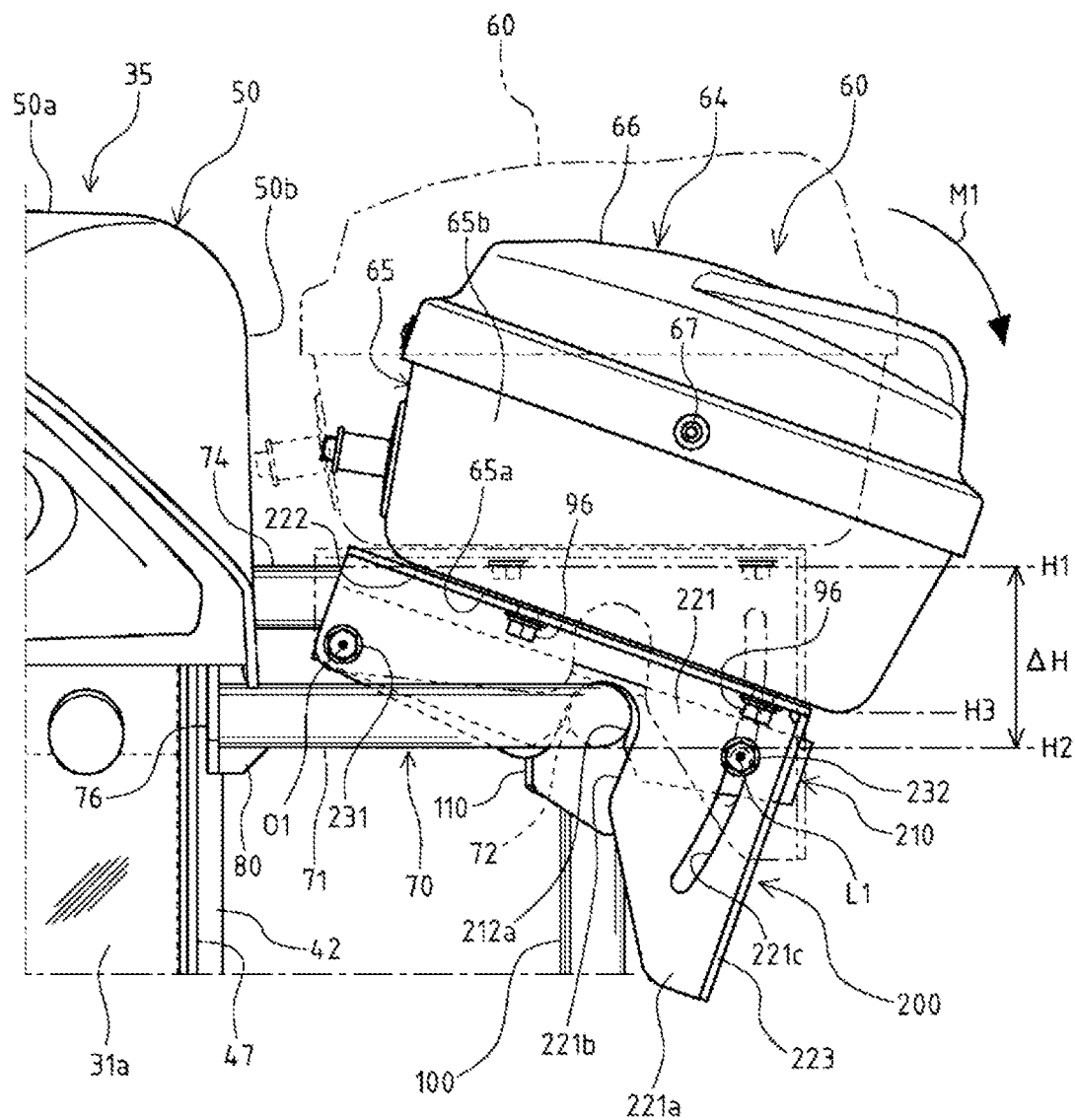
FIG. 21 is a front view showing the antenna unit in a moved state according to the another embodiment of the present invention.

As shown in FIGS. 19 through 21, in this embodiment, the antenna unit 60 is provided to be rotatable around a rotation shaft O1 that is positioned at the right lower side of the antenna unit 60 along the front-back direction. In other words, as shown in FIGS. 19 and 20, the antenna unit 60 is in a state at the first height position when the bottom face part 65a is in a horizontal state, and in a state at the second height position when the left side (right side in FIG. 20) rotated downward around the rotation shaft O1, and the bottom face part 65a in a leftward inclined state.

In the following, the state at the first height position is referred to as a normal state and the state at the second height position is referred to as an inclined state for the antenna unit 60. In addition, in the following, the normal state of the antenna unit 60 is described unless otherwise noted.

The antenna unit 60 is supported on support brackets 200, which are provided at two, front and rear, locations in a front-rear extension part 72 of the support frame 70, in a fixed state. The front side support bracket 200 is provided near a corner part formed by a front fixing part 71 and the front-rear extension part 72 with respect to the support frame 70, and the rear side support bracket 200 is provided in a front-rear intermediate part of the front-rear extension part 72.

The support bracket 200 is fixed to a mounting plate 210 fixed to the support frame 70. In other words, the support bracket 200 is provided to the support frame 70 via a mounting plate 210. The front and rear support brackets 200 are fixed to the mounting plate 210 that is an integral member. In other words, the front side support bracket 200 is fixed to the front side of the mounting plate 210, and the rear side support bracket 200 is fixed to the rear side of the mounting plate 210. The mounting plate 210 and the front and rear support brackets 200 are symmetrical or substantially symmetrical in the front-back direction in the left side view. In FIG. 19, the rear side support bracket 200 is shown in cross-section.

The mounting plate 210 is a longitudinal member in the form of a bent plate-shaped member, and is provided on the upper side of the front-rear extension part 72 with the longitudinal direction as the front-back direction. The mounting plate 210 has a body plate part 211, which is a flat plate part that forms the majority of the plate, and mounting plate parts 212 provided on both end sides of the longitudinal direction of the body plate part 211.

The body plate part 211 has a narrow width part 211a with a relatively narrow predetermined width in the middle part of the longitudinal direction, and expanded width parts 211b with a width wider than the narrow width part 211a at both end parts of the longitudinal direction (see FIG. 19). The front and rear expanded width parts 211b each have a part at the narrow width part 211a side that gradually widens from the narrow width part 211a side to the front and rear end side and has oblique edges on both sides in the width direction. The dimension of the expanded width part 211b in the width direction is, for example, almost the same as the dimension of the mounting bracket 91 of the embodiment described above in the longitudinal direction (left-right direction).

The mounting plate part 212 is a part formed by bending at right angles from the front and rear ends of the body plate part 211 downward. On the lower side of the left-right central part of the mounting plate part 212, a semicircular notched part 212a is formed for fitting the front-rear extension part 72.

The mounting plate 210 is fixed to the front-rear extension part 72 by welding or other means, in a state that the front-rear extension part 72 is fitted into the notched parts 212a of the front and rear mounting plate parts 212. The mounting plate 210 is inclined so that the body plate part 211 is inclined downward to the left. The angle that the body plate part 211 forms with the horizontal plane in the axial view of the rotation shaft O1 is, for example, about 20° The angle of the body plate part 211 to the horizontal plane in the axial view of the rotation shaft O1 is about 20 degrees.

The support bracket 200 is a longitudinal member in the form of a bent plate-shaped member, and is provided at the upper side of the front-rear extension part 72, with the longitudinal direction as the left-right direction and orthogonal to the axial direction of the front-rear extension part 72 of the support frame 70 in the plan view.

The support bracket 200 has a fixing face part 221 with the front-back direction as the plate thickness direction, a support face part 222 in a horizontal shape, which is formed by bending at right angles from the upper end of the fixing face part 221, and a side face part 223, which is formed by bending at right angles from the left end of the fixing face part 221. In the support bracket 200, the support face part 222 is a face part that receives an attachment of a case 64 of the antenna unit 60. The support face part 222 is positioned at a height above the upper end of the body plate part 211 of the mounting plate 210.

In the axial view of the rotation shaft O1, the fixing face part 221 has a shape extending in the left-right direction, and has a protruding part 221a that protrudes downwardly than the front-rear extension part 72 at the left side part, and has an approximately "L" shape as a whole. On the lower side of the left-right central part of the fixing face part 221, a concave notched part 221b is formed for fitting the front-rear extension part 72.

The front side support bracket 200 is fixed to the mounting plate 210 at two locations of both the left and right sides by a first bolt 231 and a second bolt 232 as fixing supporters, in a state where the fixing face part 221 is oriented to the rear side, and positioned on the front side of the mounting plate part 212 of the front side of the mounting plate 210, and the fixing face part 221 is overlapped with the mounting plate part 212. The first bolt 231 and the second bolt 232 pass through the fixing face part 221 and mounting plate part 212, and are screwed into nut parts 235 provided on the rear side of the mounting plate part 212. A fixing part formed by the first bolt 231 is positioned to the right of the front-rear extension part 72 of the support frame 70, and a fixing part formed by the second bolt 232 is positioned to the left of the front-rear extension part 72 of the support frame 70.

The rear side support bracket 200 is fixed to the mounting plate 210 at two locations of both the left and right sides by a third bolt 233 and a fourth bolt 234 as fixing supporters, in a state where the fixing face part 221 is oriented to the front side, and positioned on the rear side of the mounting plate part 212 of the rear side of the mounting plate 210, and the fixing face part 221 is overlapped with the mounting plate part 212. The third bolt 233 and the fourth bolt 234 pass through the fixing face part 221 and mounting plate part 212, and are screwed into nut parts 236 provided on the front side of the mounting plate part 212. A fixing part formed by the third bolt 233 is positioned to the right of the front-rear extension part 72 of the support frame 70, and a fixing part formed by the fourth bolt 234 is positioned to the left of the front-rear extension part 72 of the support frame 70.

Against these front and rear support brackets 200, the case 64 of the antenna unit 60 is fixed to the support face part 222 by fixing bolts 96. Fixing parts formed by the fixing bolts 96 is provided in each support bracket 200 at two locations on both the left and right sides. For this reason, in the support face part 222 of the support bracket 200, two holes 222a are formed at two locations of both the left and right sides for the fixing bolts 96 to pass through. The fixing bolts 96 pass through the support face part 222 of the support bracket 200 from the lower side, and are screwed into female threaded parts 97 (see FIG. 10) to fix the case 64 to the support bracket 200.

In this embodiment, the antenna unit 60 is provided at a slightly higher height than a roof part 35 with respect to the up-down direction. In other words, the antenna unit 60 has the upper face part of the case 64 positioned slightly above an upper face part 50a of a roof panel 50.

In the support configuration of the antenna unit 60 as described above, the antenna unit 60, which is integrated with the front and rear support brackets 200, is provided to be rotatable around the rotation shaft O1 with respect to the mounting plate 210 fixed to the support frame 70.

The rotary support part that supports the antenna unit 60 around the rotation shaft O1 is constituted of the fixing part formed by the first bolt 231 in the front side support bracket 200, and the fixing part formed by the third bolt 233 in the rear side support bracket 200. In other words, the first bolt 231 and the third bolt 233 have their central axes positioned on a common straight line along the front-back direction, i.e., on the rotation shaft O1.

In addition, in the front and rear support brackets 200, the second bolt 232 and the fourth bolt 234 have their central axes positioned on a common straight line L1 along the front-back direction. The second bolt 232 and the fourth bolt 234, respectively with respect to the fixing face part 221 of the support bracket 200, pass through long holes 221c that are formed in the fixing face part 221 with an approximately up-down direction as the longitudinal direction. The long hole 221c is formed in the left side part of the fixing face part 221, and is formed in a range from the upper part to the protruding part 221a. The long hole 221c has a curved shape along an arc centered at the position of the rotation shaft O1 in the axial view of the rotation shaft O1.

Thus, a rotating body including the front and rear support brackets 200 and the antenna unit 60, with the fixing parts formed by the first bolt 231 and the third bolt 233 as the fixing side support part and fixing parts formed by the second bolt 232 and the fourth bolt 234 as the movable side support part, is provided to be rotatable around the rotation shaft O1.

An example of the procedure for rotating the antenna unit 60 is described below. As shown in FIGS. 19 and 20, from the normal state of the antenna unit 60, the first bolt 231, the second bolt 232, the third bolt 233 and fourth bolt 234 are loosened. The front and rear support brackets 200 and the antenna unit 60 fixed to these brackets can be rotated around the rotation shaft O1.

Then, the antenna unit 60 and the front and rear support brackets 200 are rotated clockwise (rightward) in the front view until they are in the inclined state, i.e., from the first height position to the second height position (see FIG. 21, arrow M1). Here, in the front and rear support brackets 200, the long holes 221c serves as guide holes, and the second bolt 232 and fourth bolt 234 move along the long holes 221c. After moving the antenna unit 60 and the front and rear support brackets 200 to the second height position, tighten the first to the fourth bolts to fix the front and rear support brackets 200 to the mounting plate 210 respectively, so that the antenna unit 60 is in the inclined state.

The rotation angle of the antenna unit 60 around the rotation shaft O1 from the normal state to the inclined state is, for example, about 20 degrees. The inclination angle of the antenna unit 60 in the inclined state is the same or approximately the same as the inclination angle of the body plate part 211 of the mounting plate 210 with respect to the horizontal plane. The rotation angle of the antenna unit 60 is not particularly limited.

When the antenna unit 60 is in the normal state, the second bolt 232 and fourth bolt 234 are positioned at or near the lower end part of the long hole 221c, and when the antenna unit 60 is in the inclined state, the second bolt 232 and fourth bolt 234 are positioned at or near the upper end part of the long hole 221c. The notched part 221b of the support bracket 200 is also formed so that it does not interfere with the front-rear extension part 72 of the support frame 70 in the range of rotation of the antenna unit 60.

The antenna unit 60 is, in the normal state, is positioned on the support face part 222 of the support bracket 200, which is positioned at a height above the support frame 70, and the entire antenna unit 60 is positioned above the support frame 70.

On the other hand, the antenna unit 60 is, in the inclined state, partially positioned within a height range at which the support frame 70 is positioned. Specifically, as shown in FIG. 21, the height range in which the support frame 70 is positioned is the height range ΔH from a height position H1 of the upper end of the rear fixing part 74 to a height position H2 of the lower end of the front fixing part 71 positioned lower than the rear fixing part 74.

Meanwhile, when the antenna unit 60 is in the inclined state, a height position H3 of the lower end of the case 64, which is the lower end of the antenna unit 60, is positioned within the height range ΔH. In other words, the height position H3 of the lower end of the antenna unit 60 is positioned below the height position H1 of the upper end of the support frame 70 and above the height position H2 of the lower end of the support frame 70. In the inclined state, the antenna unit 60 has most of its upper side positioned above the support frame 70, i.e., above the height position H1.

According to the support configuration of the antenna unit 60 of this embodiment, by placing the antenna unit 60 in the inclined state, the antenna unit 60 can be positioned in a lower position relative to the normal state. As a result, with respect to work such as removing, or positioning such as adjusting height or maintaining the antenna unit 60, which is performed while the worker is on a stand, stepladder, or the like, safety can be improved by using the handrail part 100, and workability can be improved by facilitating handling of the antenna unit 60.

In this embodiment, as a configuration for changing the height position of the antenna unit 60, a configuration for rotating the antenna unit 60 around the rotation shaft O1 is adopted. However, the configuration for changing the height position of the antenna unit 60 is not limited to such a configuration. The configuration for changing the height position of the antenna unit 60 may, for example, be such that the antenna unit 60 is moved in a parallel manner while the antenna unit 60 remains in a horizontal state.

Each of the above mentioned embodiments is an example of the present invention, and the present invention is not limited to the embodiments described above. Accordingly, it is needless to say that various modifications can be made even to those other than the above-described embodiment according to the design and the like within the scope that does not depart from the technical idea of the present invention. The effects described in the present disclosure are merely illustrative and are not limited, and other effects may also be exerted.

In the embodiment described above, the support frame 70 as a support member is constituted of a pipe-shaped member, but the support member is not limited to such a configuration. The support member according to the present invention may, for example, be constituted of a plate-shaped member.

REFERENCE SIGNS LIST

1 Combine harvester (work vehicle)
4 traveling machine body
12 Driving part
30 Cabin
35 Roof part
37 Cabin left side face part (one side face part)
50 Roof panel
60 Antenna unit
70 Support frame (support member)
76 Front mounting plate
81 Rear mounting plate
100 Handrail part
110 Upper support bracket
115 Fixing plate
120 Lower support bracket
130 Auxiliary Antenna (Antenna)
200 Support bracket
210 Mounting plate

The invention claimed is:
1. A work vehicle equipped with a cabin that covers a driving part, the work vehicle comprising:
an antenna unit provided at an upper part of one side face part out of left and right side face parts of the cabin towards the front of the work vehicle;
a handrail part provided on the one side face part and used to perform work on the antenna unit; and a support member provided on the one side face part and supporting the antenna unit, wherein the support member extends back and forth and is provided in such a state that front and rear end parts thereof are fixed to the one side face part, and wherein a first end of the handrail part is connected to the support member and a second end is fixed to the one side face part.

2. The work vehicle according to claim 1, wherein the antenna unit and the handrail part are arranged so as to be positioned in front of and behind each other in a plan view, and wherein the plan view is a planar view from the top of the work vehicle.

3. The work vehicle according to claim 1, wherein the handrail part extends up and down, and wherein the first end is an upper end part thereof and the second end is a lower end part thereof.

4. The work vehicle according to claim 1, wherein the cabin is provided to be rotatable around a shaft in an up-down direction with respect to a machine body so that the cabin opens outward in a left-right direction of the machine body of the work vehicle; and the one side face part is a side face part that is positioned inside in the left-right direction of the machine body out of the left and right side face parts of the cabin.

5. The work vehicle according to claim 1, wherein the handrail part is constituted of metal components and is provided so that an upper end thereof is positioned at a height below the antenna unit.

6. The work vehicle according to claim 5, wherein the antenna unit is provided to be repositionable with respect to a height position thereof, which is a position thereof in the up-down direction, between a first height position in which the entire antenna unit is positioned above the support member and a second height position in which at least a part of the antenna unit is overlapped with the support member.

7. The work vehicle according to claim 1, further comprising an antenna for obtaining information about the antenna unit, wherein the antenna is provided at a connection part of the handrail part with respect to the support member.

* * * * *